(12) United States Patent
Kubota

(10) Patent No.: US 8,539,069 B2
(45) Date of Patent: Sep. 17, 2013

(54) DISTRIBUTED STORAGE SYSTEM, METHOD THEREOF AND COMPUTER READABLE MEDIUM STORING DISTRIBUTED STORAGE PROGRAM

(75) Inventor: Tomonori Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 13/020,230

(22) Filed: Feb. 3, 2011

(65) Prior Publication Data

US 2011/0246643 A1    Oct. 6, 2011

(30) Foreign Application Priority Data

Mar. 31, 2010 (JP) ................................. 2010-082312

(51) Int. Cl.
*G06F 15/173* (2006.01)
(52) U.S. Cl.
USPC ............................ 709/224; 709/239; 709/241
(58) Field of Classification Search
USPC .......................... 709/238, 239, 240, 241, 242
See application file for complete search history.

(56) References Cited

U.S. PATENT DOCUMENTS

| 8,209,511 B2 * | 6/2012 | Tomita et al. ................. 711/165 |
| 2007/0008884 A1 * | 1/2007 | Tang .............................. 370/230 |
| 2008/0201336 A1 * | 8/2008 | Yamato ........................... 707/10 |

FOREIGN PATENT DOCUMENTS

| JP | 8-30495 | 2/1996 |
| JP | 2005-209055 | 8/2005 |
| JP | 2008-204206 | 9/2008 |

* cited by examiner

*Primary Examiner* — Anh-Vu Ly
*Assistant Examiner* — Hashim Bhatti
(74) *Attorney, Agent, or Firm* — Staas & Halsey LLP

(57) ABSTRACT

A distributed storage system includes, a plurality of storages configured to store a plurality of items of block data obtained by dividing an original data in a distributed manner, a route planning unit configured to obtain unused bandwidth information of a plurality of networks that are connected to the plurality of storages, and a balancing control unit configured to obtain block data that is a target of data transfer among the plurality of the storages based on the unused bandwidth information of the plurality of networks, and position information indicating a position of the block data in the original data.

17 Claims, 19 Drawing Sheets

_US 8,539,069 B2_

DISTRIBUTED STORAGE SYSTEM, METHOD THEREOF AND COMPUTER READABLE MEDIUM STORING DISTRIBUTED STORAGE PROGRAM

CROSS-REFERENCE TO RELATED APPLICATIONS

This application is based upon and claims the benefit of priority of the prior Japanese Patent Application No. 2010-82312, filed on Mar. 31, 2010, the entire contents of which are incorporated herein by reference.

FIELD

The various embodiments discussed herein relate to a distributed storage system and method thereof, and a non-transient computer readable medium storing a distributed storage program.

BACKGROUND

Generally, for a distributed storage system, for example, Redundant Array of Independent Disks (RAID) devices are typical. In a RAID device, data is stored in a plurality of storages in a distributed manner.

Japanese Laid-open Patent Publication No. H.08-030495 discusses that when a directory management device is informed by a management terminal that a number of usable storage devices has increased, the directory management device finds segments to be moved, informs a data management device of arrangement information of the segments before and after movement, and requests the movement of the segments. The data management device which receives the request stores the arrangement information of the segments required for the movement in a movement information storage unit, and copies the segments from the movement-source storage device to a movement-destination storage device when access to the storage devices decreases. After the segments are copied, completion of the movement is reported to the directory management device.

Japanese Laid-open Patent Publication No. 2008-204206 discusses that a split data management unit determines and manages arrangement destinations of a plurality of duplicate data corresponding to respective split data configuring a content. The split data management unit performs the deletion, addition, or rearrangement of the split data in a predetermined timing. When an access to the content from a host is requested, the split data management unit determines the access destinations of the split data configuring the content. A number of duplication planning unit determines the number of duplication of the respective split data and defines all available storage devices as arrangement destination candidates, and determines arrangement so that the plurality of duplicate data corresponding to the same split data are arranged equally to the respective storage devices.

Japanese Laid-open Patent Publication No. 2005-209055 discusses that a storage having a plurality of groups of volumes with a plurality of logic volumes to which input/output are performed exclusively has a load monitoring unit that monitors an imbalance of the loads of the logic volumes. When the load monitoring unit detects an imbalance of the loads, a certain logic volume is moved to another logic volume within another group of logic volumes in which the content of the logic volumes within the group of volumes of the greater load is copied into a preliminary logic volume in the group of volumes with the smaller load.

In typical RAID devices, a bandwidth of a data transmission line is substantially constant regardless of time of day and data input/output performance of a plurality of storages is substantially the same. Under the presuppositions, the RAID device achieves a faster access by storing data in each of the storages substantially uniformly compared with when data is input/output to and from a single storage.

However, with improvement of network performance, a plurality of storages and a processing device such as a server are not connected by a dedicated transmission line but connected by networks such as Local Area Network (LAN) and Storage Area Network (SAN) in many cases. In a distributed storage system under the network environment, bandwidths of networks which are data transfer routes may be dynamically changed.

SUMMARY

In accordance with an aspect of an embodiment described herein, a distributed storage system includes, a plurality of storages configured to store a plurality of items of block data obtained by dividing an original data in a distributed manner, a route planning unit configured to obtain unused bandwidth information of a plurality of networks that are connected with the plurality of storages, and a balancing control unit configured to obtain block data that is a target of data transfer among the plurality of the storages based on the unused bandwidth information of the plurality of networks, and position information indicating a position of the block data in the original data.

An object and advantages of the invention will be realized and attained by at least the features, elements, and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
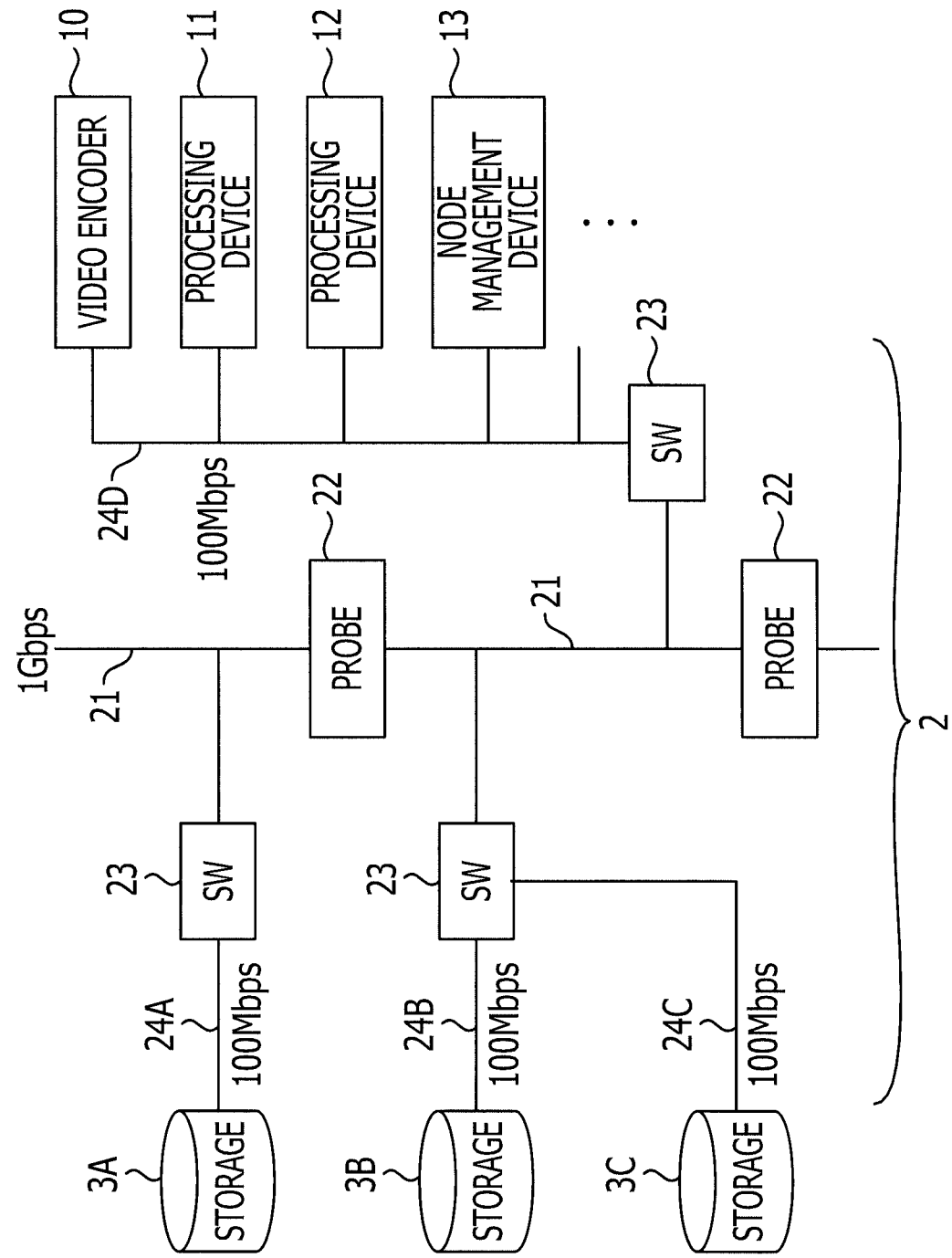
FIG. 1 is an example of a distributed storage system.

Reference will now be made in detail to the embodiments, examples of which are illustrated in the accompanying drawings, wherein like reference numerals refer to the like elements throughout. The embodiments are described below to explain the present invention by referring to the figures.

Among other studies by the inventor, the inventor studied accesses when a network bandwidth, which is a data transfer route, is dynamically changed in a distributed storage system under a network environment as described above. In this case, a high-speed access is difficult to achieve even if data is stored in each of the storages substantially uniformly.

Figure 14A:
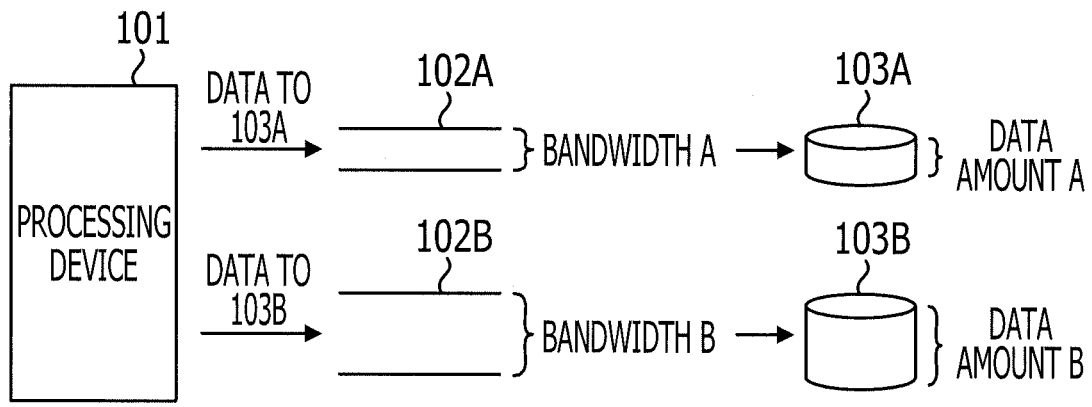
FIGS. 14A and 14B illustrate a relationship between storing data and bandwidths.

For example, as illustrated in FIG. 14A, a processing device 101 stores data in a storage 103A connected through a network 102A and a storage 103B connected through a network 102B. At the time of FIG. 14A, a bandwidth A of the network 102A is narrower than a bandwidth B of the network 102B. Meaning, at any given time, the transmission or throughput of the network 102A may have capacity smaller than that of the network 102B.

In this case, the processing device 101 writes data to the storage 103A and the storage 103B by making the most of the bandwidth A of the network 102A and the bandwidth B of the network 102B respectively. Consequently, a data amount A stored in the storage 103A and a data amount B stored in the storage 103B differ because of the bandwidth of corresponding network. As a result, the stored data amount is not balanced.

Figure 14B:
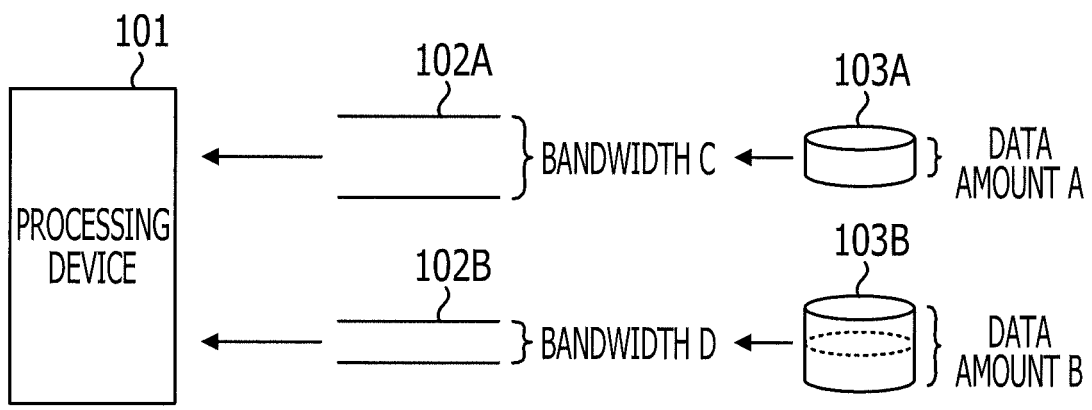

Data stored as illustrated in FIG. 14A is read by the processing device 101 as illustrated in FIG. 14B. The bandwidth of the network 102A and that of the network 102B are dynamically changed with time elapses, and are changed from the state of FIG. 14A. For example, conversely to FIG. 14A, at the time of FIG. 14B, a bandwidth C (=B) of the network 102A is wider than a bandwidth D (=A) of the network 102B.

In this case, the processing device 101 reads data from the storage 103A and the storage 103B by making the most of the bandwidth C of the network 102A and the bandwidth D of the network 102B. Consequently, data with the data amount A stored in the storage 103A is all read. In contrast, data with data amount B stored in the storage 103B is not completely read and a portion B' of the data remains in the storage 103B at the time when reading data stored in the storage 103A is completed.

Figure 15:
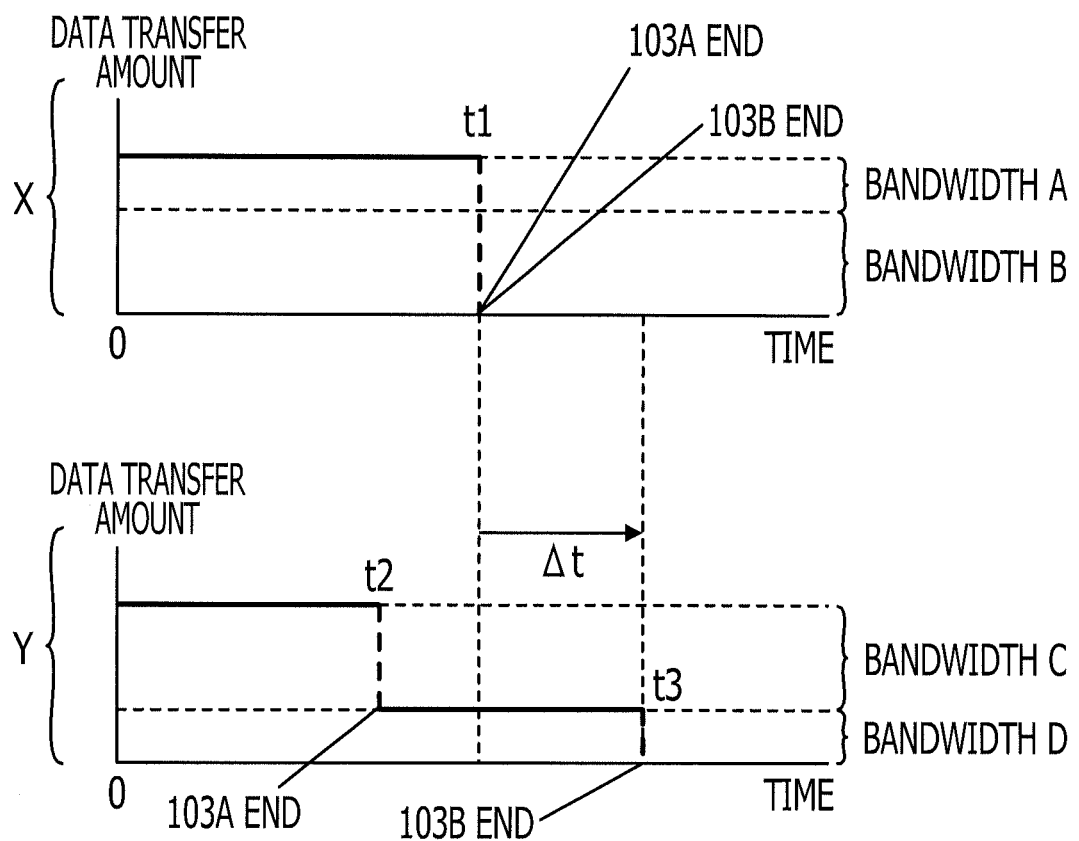
FIG. 15 illustrates a relationship between storing data and bandwidths.

FIG. 15 illustrates a relationship between a data transfer amount and a transfer time when a bandwidth of a network is dynamically changed.

A part X in FIG. 15 indicates a transfer time of the data transfer illustrated in FIG. 14A. In the part X in FIG. 15, the bandwidth A of the network 102A and the bandwidth B of the network 102B are utilized at substantially a respective maximum. Accordingly, transfer of data amount A using the bandwidth A and transfer of data amount B using the bandwidth B end at substantially the same time at time t1. Thus, data transfer time t1 in the part X of FIG. 15 is substantially at a minimum. Although, FIG. 14A illustrates writing data, reading data may be considered substantially the same.

Figure 2:
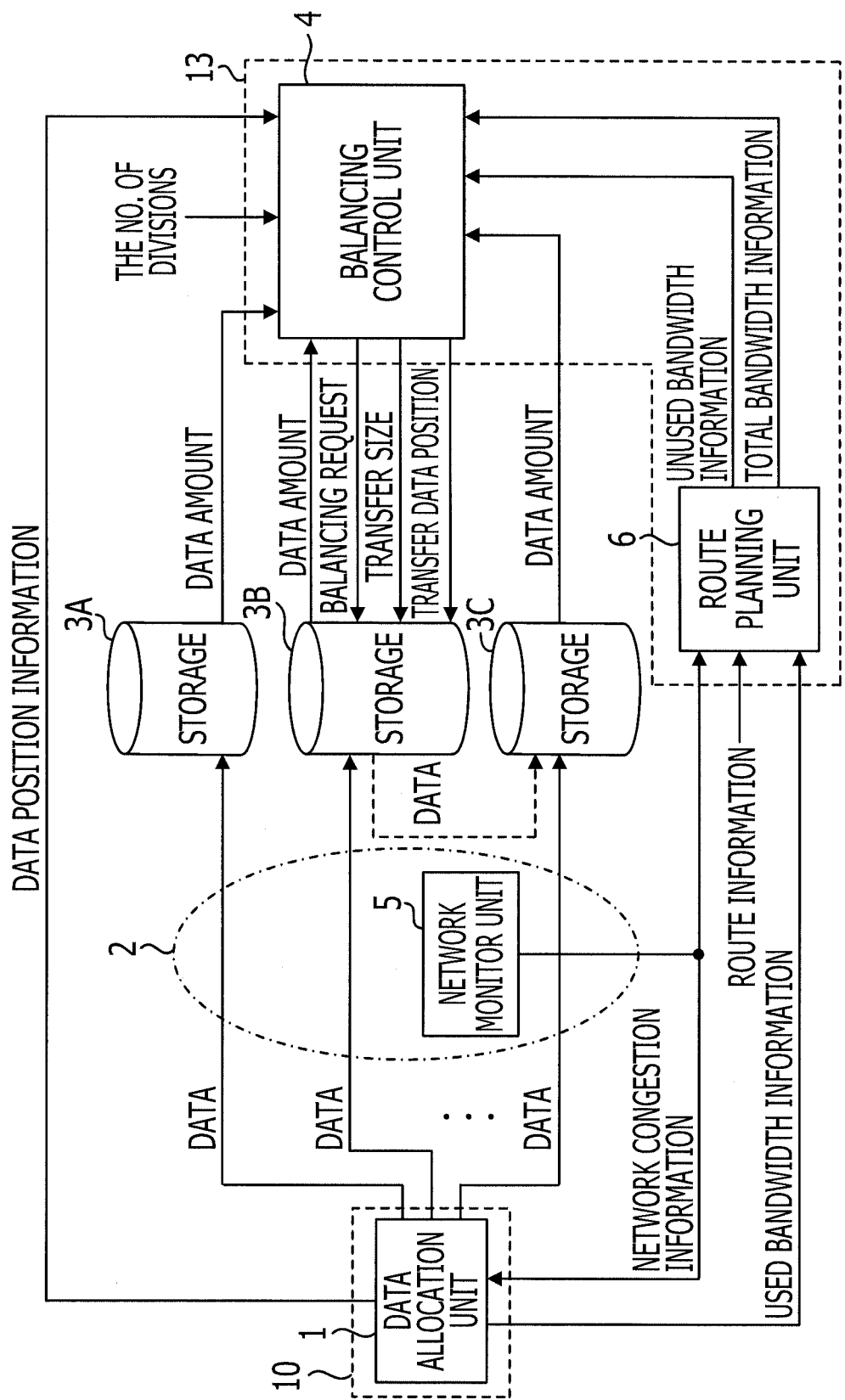
FIG. 2 is an example of a distributed storage system.

Meanwhile, the part Y of FIG. 15 illustrates a transfer time of data transfer illustrated in FIG. 2. In the part Y of FIG. 15, transfer of data amount A using the bandwidth C of the network 102A ends at time t2 which is earlier than the time t1, whereas transfer of data amount B using the bandwidth D of the network 102B ends at time t3 which is later than the time t1. Thus, the data transfer time in the part Y of FIG. 15 is delayed for a length of Δt than the data transfer time of the part X of FIG. 15. This is because the bandwidth C of the network 102A may not be effectively utilized in the part Y of FIG. 15.

The above-described dynamic change of the network bandwidth may be caused due to factors which are described below in detail.

Figure 16:
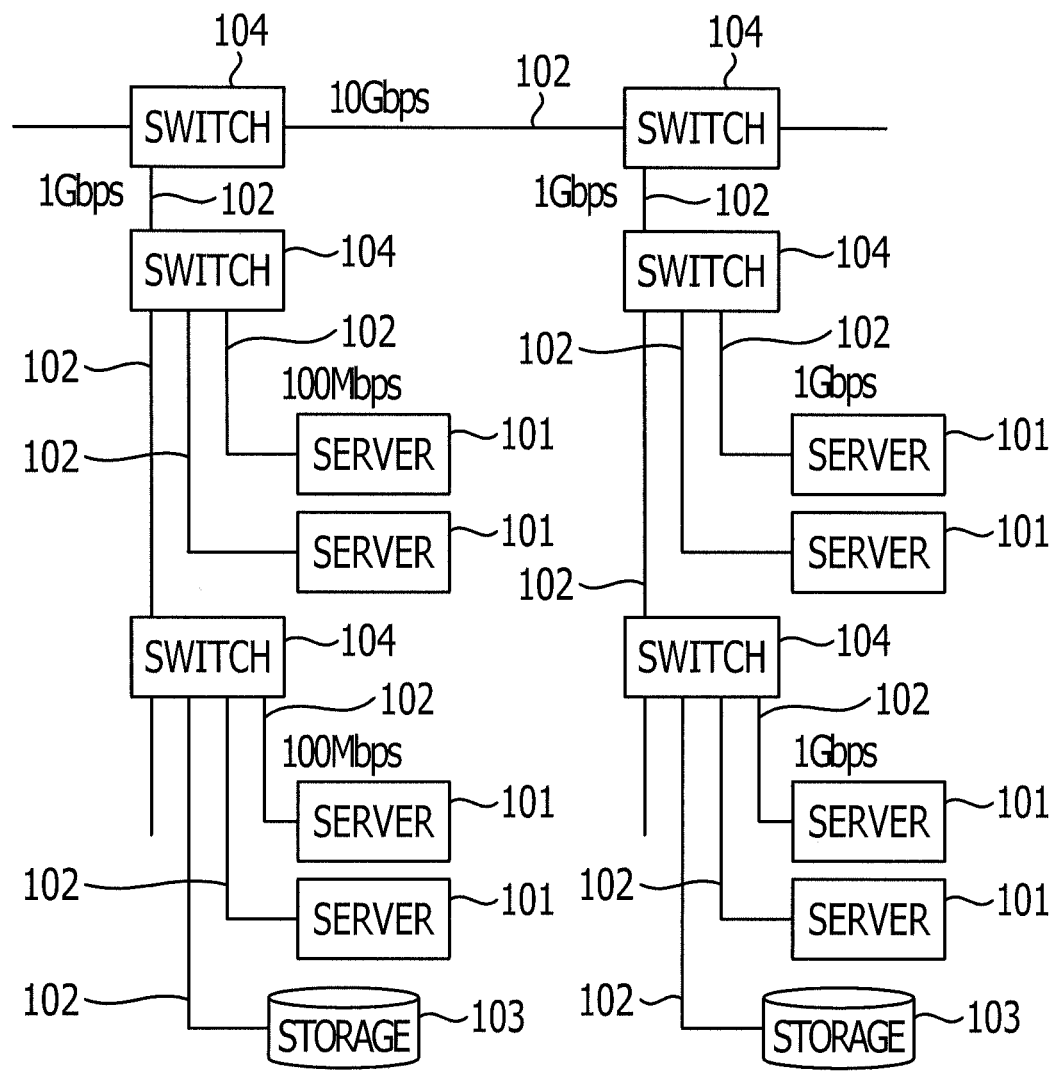
FIG. 16 illustrates bandwidths in a distributed storage system.

For example, a network may be connected through a plurality of switches and network bandwidths among switches that may differ. For example, as illustrated in FIG. 16, in a data center, even if a bandwidth of a backbone is sufficiently wide, 10 Gbps, a bandwidth of an end of a switch of the network end may be narrow, for example, 100 Mbps.

In addition to this, a plurality of application programs (hereinafter called applications) that operates on a plurality of servers 101 inputs and outputs data to and from a plurality of storages 103 at various timings through networks 102 with different bandwidths. Thus, network bandwidths that the respective servers may use change according to various conditions, such as for example, a time of the day.

Figure 17:
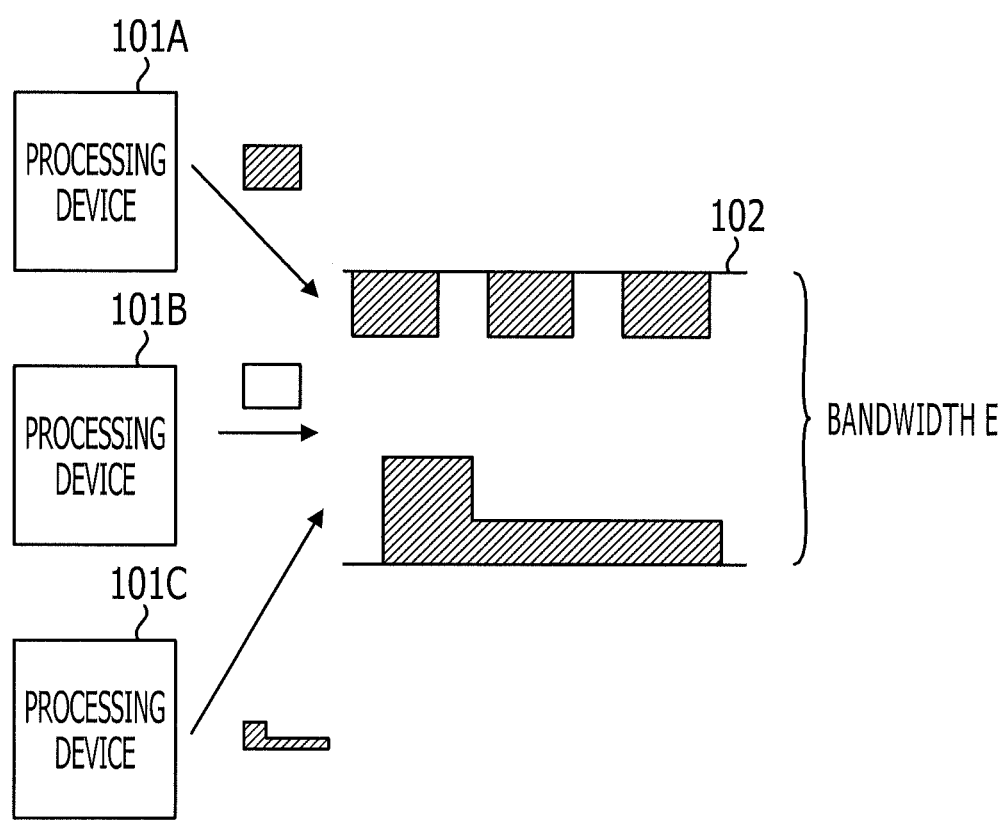
FIG. 17 illustrates a change in a bandwidth of a distributed storage system.

For example, as illustrated in FIG. 17, processing devices 101A, 101B and 101C may share one network. In such a case, an application operated on the processing device 101A intermittently inputs and outputs data. The application operated on the processing device 101C successively inputs and outputs data in a small bandwidth after inputting and outputting data in temporally a large bandwidth. In this case, a network's bandwidth that the application operated on the processing device 101B may use is a bandwidth obtained by subtracting a bandwidth used by the processing device 101A and the processing device 101C from an entire bandwidth E, and the bandwidth is changed with time. As described above, a bandwidth that the processing device 101B may use is unpredictable and is changed in a complicated manner.

When a network and storages are virtualized, a bandwidth is also changed by a network and a plurality of application programs as described above.

As described above, when a bandwidth of a network is dynamically changed, according to the study by the inventor, adjusting typically a data amount without considering a content of data to be stored may not optimize distribution of data in response to a dynamically changing network bandwidth. Particularly, according to the study by the inventor, distribution of data that is successively accessed such as image data stored in a plurality of storages may not be substantially optimized. In other words, substantially optimized distribution of data may not be achieved unless data is allocated by considering access pattern of the data (access time).

For example, even if data load is balanced by moving data among a plurality of storages, a faster data input and output may not be achieved. This is because if data access (access pattern) from a device that actually uses the data is not considered, a time until the data is used may not be reduced and that the faster data input and output may not be achieved. Moreover, even when a plurality of copies of data are stored in a plurality of storages and a storage with a small load is selected for an access, almost always the plurality of copies is needed. Accordingly, a bandwidth that is available at storing data is reduced.

Figure 18A:
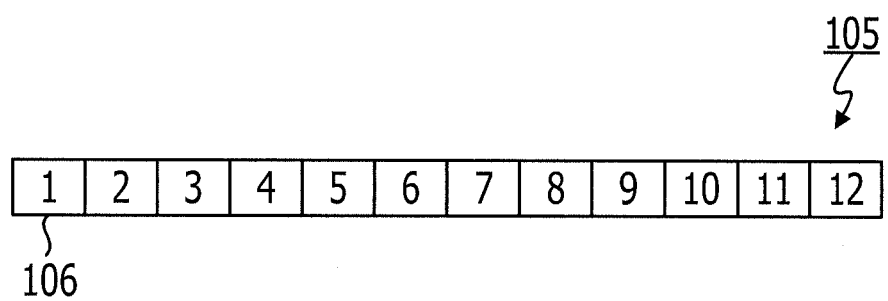
FIGS. 18A and 18B illustrate reading data in a distributed storage system.

For example, as illustrated in FIG. 18A, a data (original data) 105 is considered that may be divided into block data "1" to "12." In the original data 105, block numbers allocated to each block data indicates a position of the block data 106 in the original data 105. The number allocated to the block data 106 is an order to process the block data 106. Processing to arrange the block data 106 read from the storage 103 by the order of block numbers is carried out by a processing device that processes the original data 105.

Figure 18B:
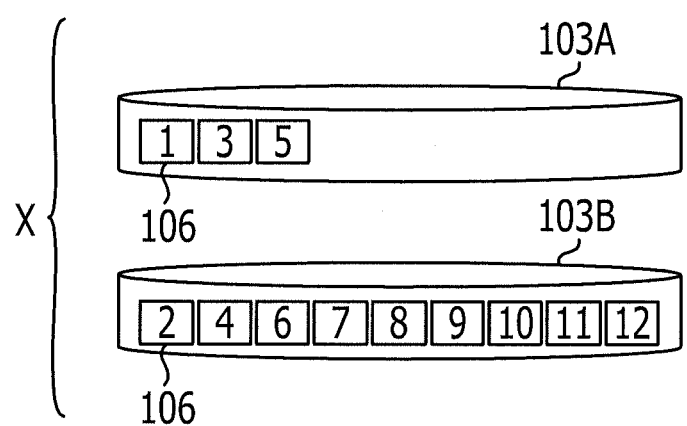

The original data 105 is stored, for example, as illustrated in FIG. 18B, in two storages, the storage 103A and the storage 103B in a distributed manner. At this time, as in the case of FIG. 14A, the number of items of block data 106 in the two storages, the storage 103A and the storage 103B is not balanced due to an imbalance of the network bandwidth when the original data 105 is stored. For example, the number of items of block data 106 stored in the storage 103A is "3", while the number of items of block data 106 stored in the storage 103B is "9."

Three block data, "10", "11", and "12" are transferred from the storage 103A to the storage 103B. Consequently, as illustrated in the part Y in FIG. 19, a number of items of the block data 106 in the plurality of the storage 103A and the storage 103B is balanced. However, as described above, even if the number of items of the block data 106 is balanced, the content of the original data 105 is not considered.

The original data is read from the plurality of storages 103A and 103B. At the time, a network bandwidth is changed and a network bandwidth that the storage 103A uses and that the storage 103B uses are substantially equal.

Figure 19:
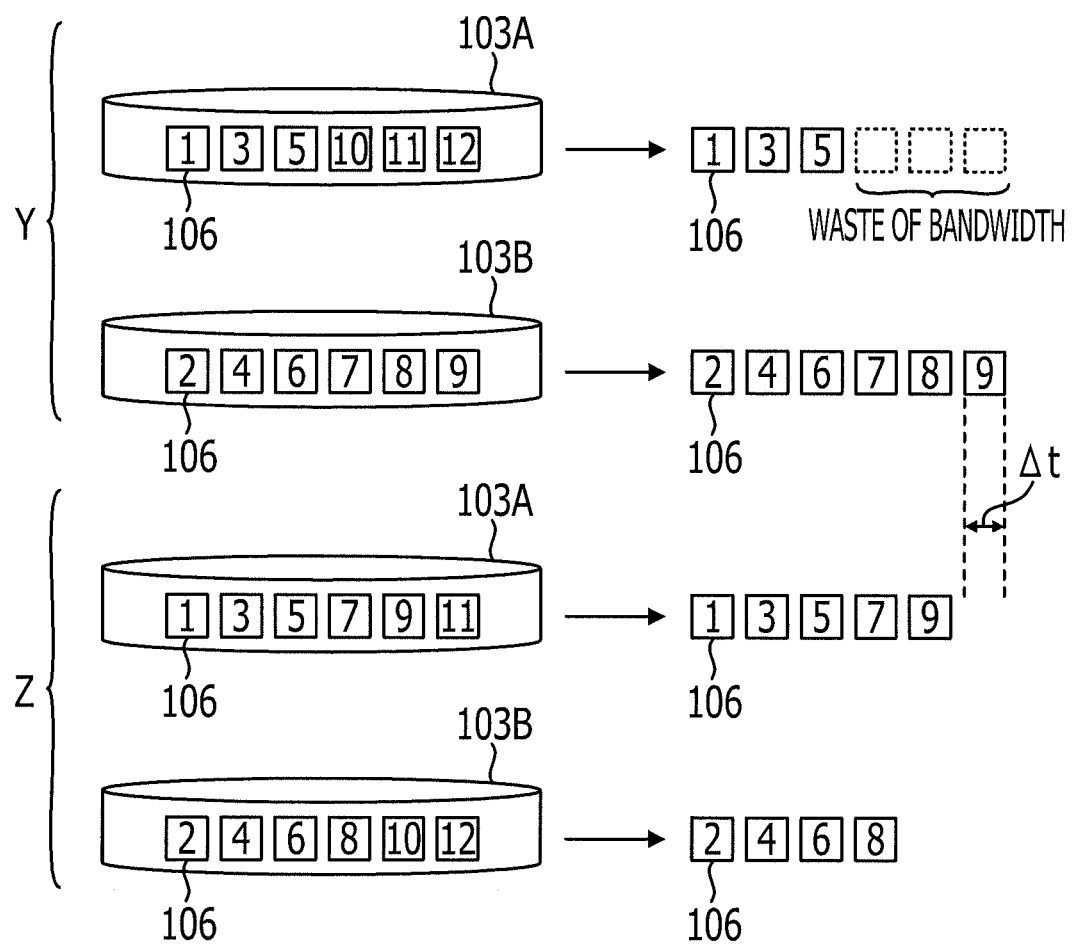
FIG. 19 illustrates reading data in a distributed storage system.

Under the condition, as illustrated in the part Y of FIG. 19, the processing device 101 successively reads block data "1" to "9", and executes the processing. In this case, when block data "1", "3", and "5" are read, all of the desired block data 106 is not obtained yet. Moreover, the network bandwidth that the storage 103A may use thereafter is wasted because no data to be read exists. The block data 106 corresponding to the wasted bandwidth is read from the storage 103B. Accordingly, data input and output is delayed for a length of Δt from a perspective of the processing device 101.

Meanwhile, according to a review by the inventor, wasting a network bandwidth that is available to the storage 103A as illustrated in the part Y of FIG. 19 may be reduced, if not prevented, by taking account of the content of the original data 105 and balancing the number of items of the block data 106 as illustrated in the part Z of FIG. 19.

For example, in the part Z of FIG. 19, three items of block data "7", "9", and "11" are transferred from the storage 103A to the storage 103B by taking account of the content of the original data 105. Accordingly, the number of items of block data 106 in the plurality of storages 103A and 103B is balanced by taking account of the content of the original data 105.

The original data is read from the plurality of storages 103A and 103B. At the time, the network bandwidth is changed and the network bandwidth used by the storage 103A and that of the storage 103B are substantially equal.

Under the condition, as illustrated in the part Z of FIG. 19, the processing device 101 successively reads block data 1 to 9, and executes the processing. In this case, the block data 1 to 9 is successively read from the storage 103A and the storage 103B without wasting the available network bandwidth. Thus, data input and output ends earlier for a length of Δt from a perspective of the processing device 101.

The disclosed distributed storage system and the program substantially optimize distribution of data stored in a plurality of storages in response to a dynamically changing network bandwidth by taking account of the content of the original data.

FIGS. 1 and 2 illustrate configurations of distributed storage systems.

The distributed storage system includes a video encoder 10, a processing device 11, a processing device 12, a node management device 13, a plurality of storages (storage nodes or storage devices) 3A, 3B and 3C (3A to 3C), and a network 2 that connects the above-described components. The video encoder 10 and the processing devices 11 and 12 store various data in the plurality of storages 3A to 3C in a distributed manner. The node management device 13 manages storing data to the plurality of storages 3A to 3C. The processing devices 11 and 12 may be omitted. The node management device 13 may store data to the plurality of storages 3A to 3C. The node management device 13 and the video encoder 10 may be the same device.

The video encoder 10, the processing devices 11 and 12, and the node management device 13 may be collectively called a plurality of processing devices 10, 12 and 13 (10 to 13). The number of plurality of processing devices 10 to 13, in other words, the number of computers that store data to the plurality of storages 3A to 3C is not limited to four. Moreover, the number of the plurality of storages 3A to 3C that store data is not limited to three.

The network 2 includes an upper network 21, a probe 22, a switch (SW) 23, and lower networks 24A, 24B, 24C and 24D (24A to 24D). The upper network 21 is, for example, a backbone network with 1 Gbps transmission rate. The probe 22, which is a communication device that transfers data, is inserted in the upper network 21. A switch 23 is a network switch that is connected between the upper network 21 and the lower networks 24A to 24D and transfers received data to the switch 23 to which the plurality of processing devices that is destinations of the data is connected, or the switch 23 to which the plurality of storages 3A to 3C is connected. The lower networks 24A to 24D are, for example, ends of networks with 100 Mbps transmission rate. The configuration of the network 2 is not limited to that illustrated in FIG. 1.

For example, the video encoder 10 stores video data in the plurality of storages 3A to 3C in a distributed manner. At this time, the video data is transferred from the video encoder 10 to the plurality of storages 3A to 3C by passing through in the order of the network 24D, the switch 23, the network 21, the probe 22, the switch 23, and the networks 24A to 24C.

As illustrated in FIG. 2, the distributed storage system includes a data allocation unit 1, a balancing control unit 4, a network monitor unit 5, and a route planning unit 6. Accordingly, the distributed storage system makes data amounts stored in the plurality of storages 3A to 3C substantially uniform.

In the example of FIG. 2, the data allocation unit 1 is provided, for example, in the video encoder 10. The data allocation unit 1 may be provided in any of the processing devices 10 to 13 and provided in a device that stores data in the plurality of storages 3A to 3C. The balancing control unit 4 and the route planning unit 6 are provided in the node management device 13. The network monitor unit 5 is provided in the network 2, for example, in the plurality of probes 22 (FIG. 1).

The data allocation unit 1 divides original data into a plurality of items of block data. The original data is stored in the plurality of storages 3A to 3C in a distributed manner. The original data is, for example, video data and is input to the video encoder 10 from an outside of the distributed network system through the network 2. The block data is a processing unit of a processing device that processes the original data, in other words, a processing program. Thus, block data is defined depending on a processing device that processes the original data, in other words, the processing program. For example, block data is data with a fixed length and may be one page of video signals, one frame of video signals, and image signals of 16 dots×16 dots. The size of block data may be a variable length.

The data allocation unit 1 stores the divided plurality of items of block data into the storages 3A to 3C through the network 2. Accordingly, the storages 3A to 3C store the plurality of items of block data obtained by dividing the original data in a distributed manner.

At the time, data amounts in the storages 3A to 3C are not considered. Therefore, the block data is transmitted to the storage 3 that is connected to the networks 24A to 24C that are available to the data allocation unit 1 at the time and stored in the storage 3. The data allocation unit 1 obtains networks 24A to 24C that are available to the data allocation unit 1 at that time based on network congestion information received from the network monitor unit 5.

Each of the storages 3A to 3C notifies the balancing control unit 4 of a data amount for the original data. The data amount is notified to the balancing control unit 4 every time each of the storages 3A to 3C receives block data. Moreover, the data amount is notified for each original data.

The data allocation unit 1 notifies the balancing control unit 4 of data position information. The data position information is notified every time the data allocation unit 1 transmits block data to the storages 3A to 3C. The data position information is, for example, information that indicates a position of block data in the original data.

The data allocation unit 1 notifies the route planning unit 6 of used bandwidth information. The used bandwidth information is notified every time the data allocation unit 1 transmits block data to the storages 3A to 3C for each of the plurality of the networks 24A to 24D and the plurality of the networks 21 used for the transmission. The used bandwidth information indicates bandwidth used at the time by the data allocation unit 1 for each of the plurality of the networks 24A to 24D and the plurality of the networks 21.

The network monitor unit 5 monitors the network 2 that includes the plurality of the networks 24A to 24C that are connected to the storages 3A to 3C and obtains bandwidth information for the network 2 that includes the plurality of the networks 24A to 24C. For example, the network monitor unit 5 monitors each of the networks 24A to 24D and the plurality of the network 21, generates the network congestion information based on the monitored results, and transmits the results to the data allocation unit 1 and the route planning unit 6. The network congestion information indicates information of the bandwidth used at the time for each of the plurality of networks 24A to 24D included in the network 2 and the plurality of networks 21.

The route planning unit 6 obtains unused bandwidth information for the network 2 that includes the plurality of the networks 24A to 24C that are connected to the storages 3A to 3C. The unused bandwidth of the network 2 that includes the plurality of the networks 24A to 24C is obtained based on the bandwidth information for the network 2 that includes the plurality of the networks 24A to 24C.

For example, the route planning unit 6 generates unused bandwidth information and total bandwidth information based on network congestion information and route information and transmits the information to the balancing control unit 4. The route information indicates routes (available routes) that may be used by the storages 3A to 3C respectively. The route information may be known based on the configuration of the distributed network system illustrated in FIG. 1, and is input, for example, by the network monitor unit 5 or the node management device 13. The unused bandwidth information indicates an available bandwidth at the time for each route, in other words, for each of the storages 3A to 3C. The total bandwidth information is information indicating an available total bandwidth for each route, in other words, for each of the storages 3A to 3C.

The balancing control unit 4 obtains transfer target block data based on unused bandwidth information for the network 2 that includes the plurality of the networks 24A to 24C and data position information. The transfer target block data is block data for data transfer among the storages 3A to 3C.

For example, the balancing control unit 4 generates a balancing request, a transfer size, and a transfer data position based on the data position information, the number of divisions, the unused bandwidth information, the total bandwidth information and the data amount notified by the storages 3A to 3C. The number of divisions is information indicating the number of storages 3A to 3C (the number of storage nodes) to which one original data item is stored in a distributed manner. The number of divisions is, for example, input from the data allocation unit 1.

A storage 3 that transmits block data in response to a balancing request is called a transfer source storage 3. Moreover, a storage 3 that receives the block data transmitted in response to the balancing request is called a transfer destination storage 3.

The balancing control unit 4 transmits the balancing request, the transfer size, and the transfer data position to the transfer source storage 3. The transfer source storage 3 that receives the balancing request transfers transfer target block data that is block data specified by the transfer data position because the number of items of block data stored in the transfer source storage 3 is larger than the number of items of block data stored in the transfer destination storage 3. The transfer destination storage 3 receives and stores the transmitted transfer target block data because the number of items of block data stored in the transfer destination storage 3 is less than the number of items of data block stored in the transfer source storage 3.

The balancing request is a transfer request that requests the transfer source storage 3 to transfer the transfer target block data to the transfer destination storage 3. The balancing request includes an address of the transfer destination storage 3. The transfer size is information indicating a size of the transfer target block data. The transfer data position is, for example, data position information indicating a position of the transfer target block data in the original data.

Figure 3:
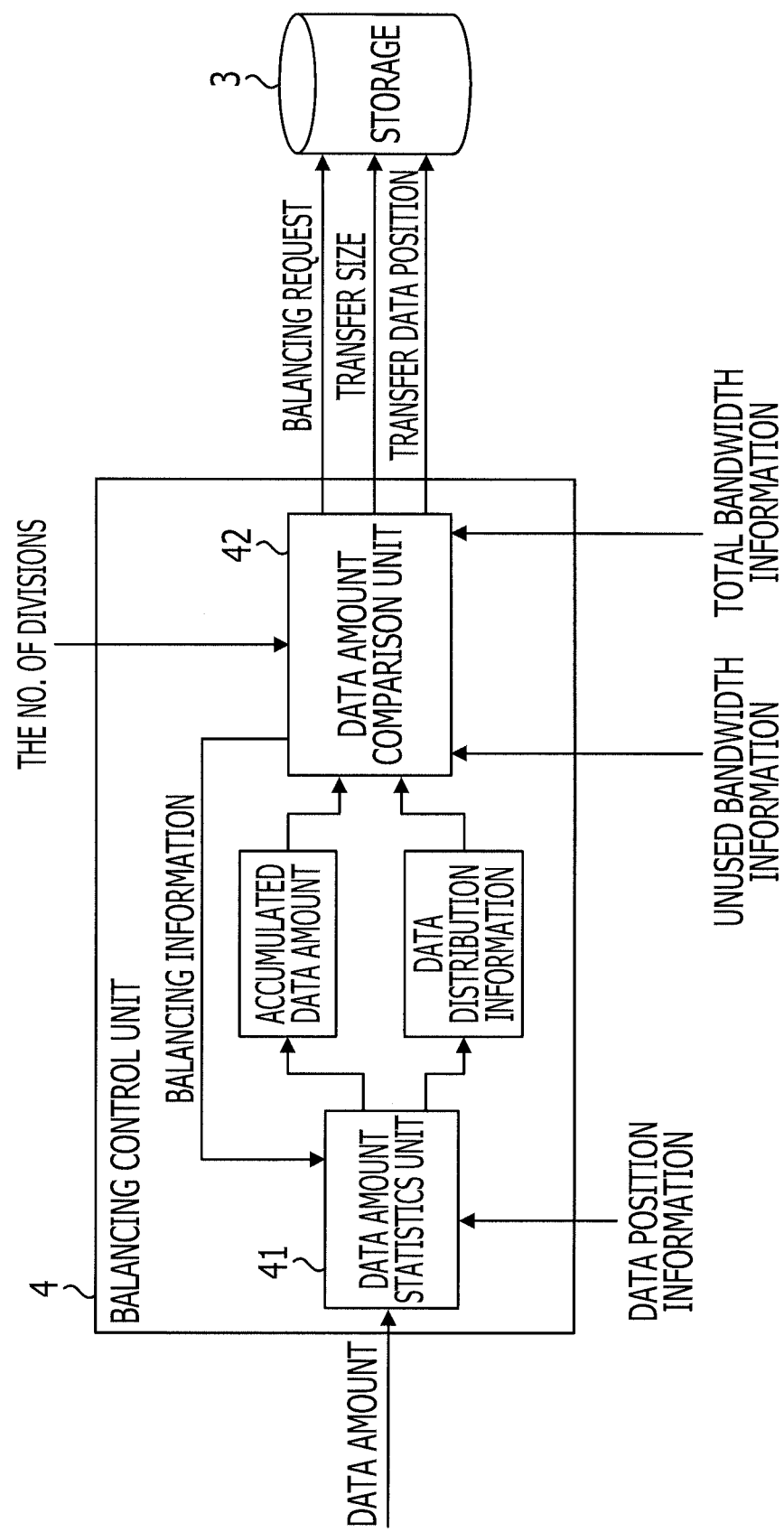
FIG. 3 is an example of a balancing control unit.
Figure 4:
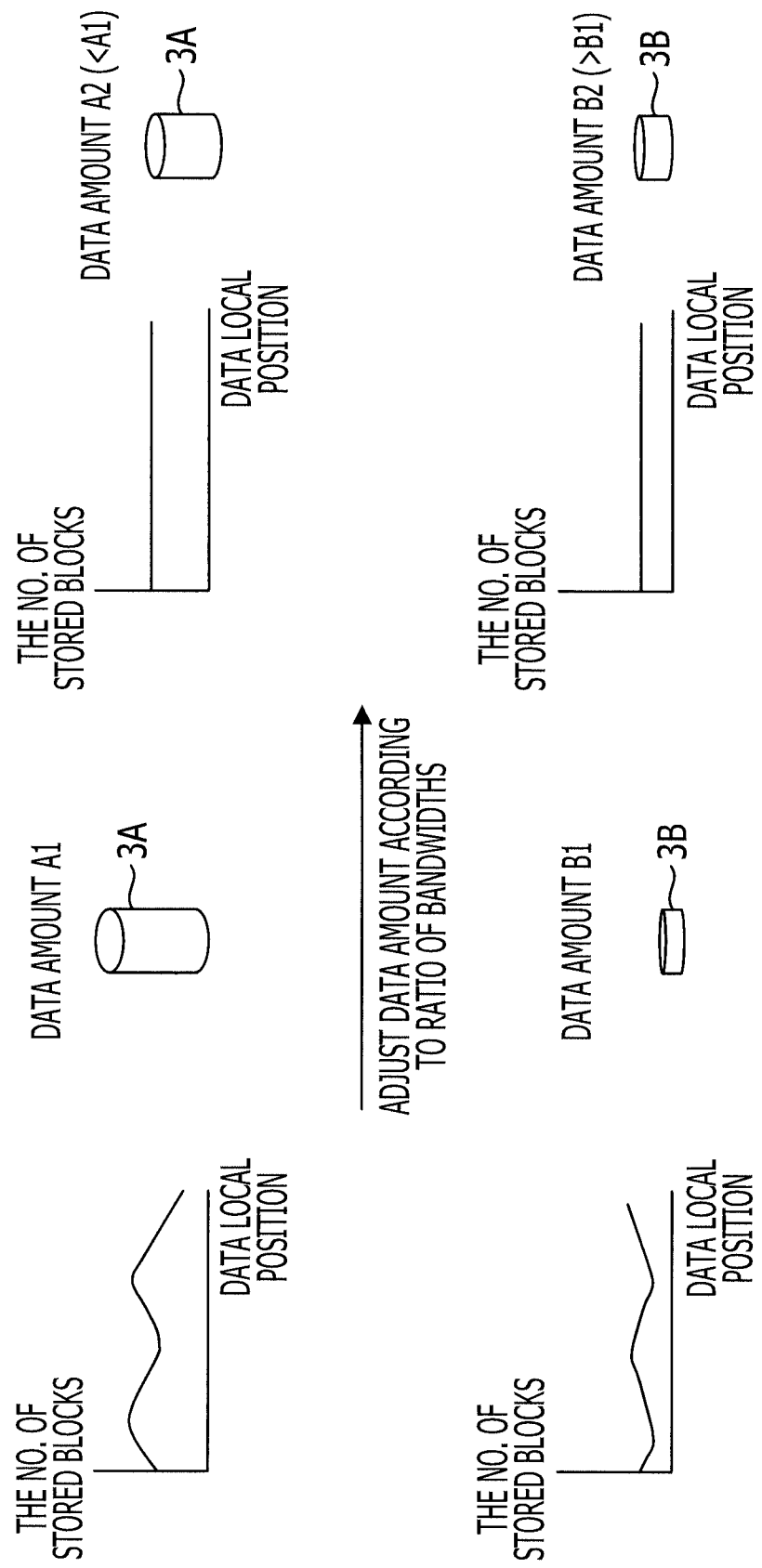
FIG. 4 illustrates a balancing control processing.
Figure 5:
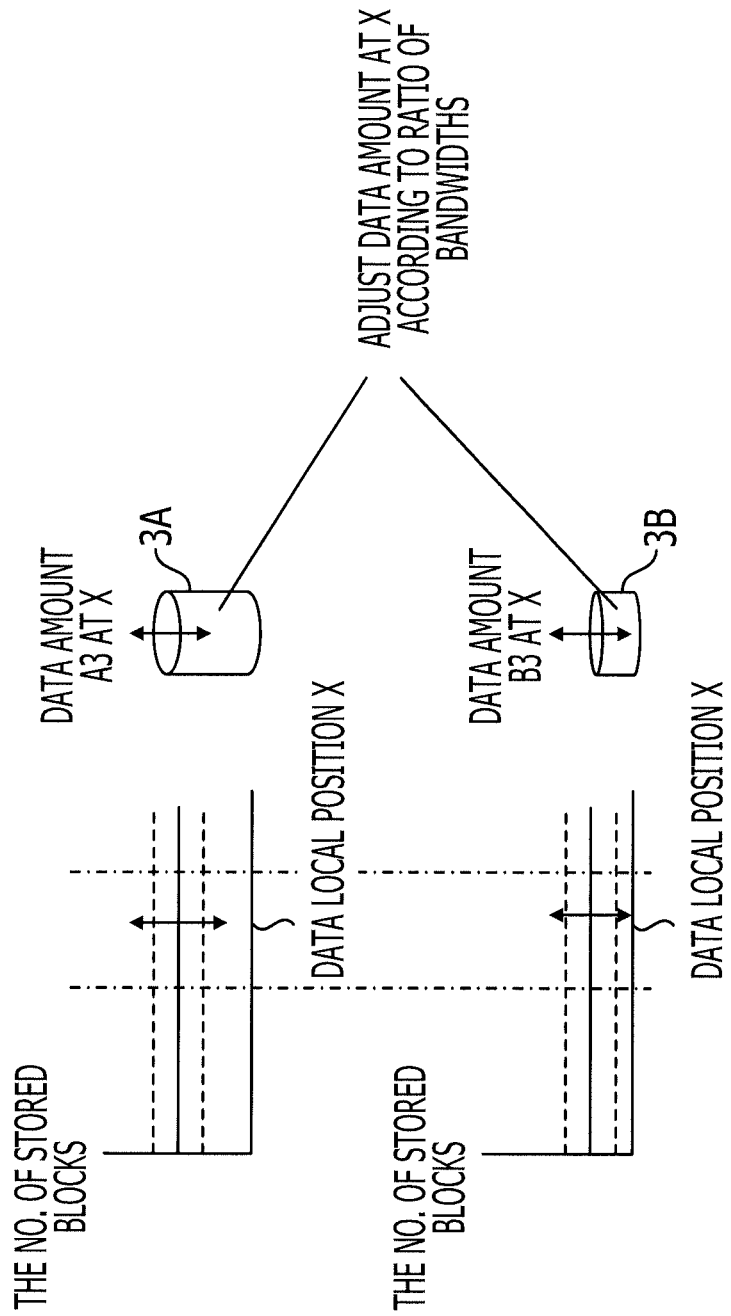
FIG. 5 illustrates a balancing control processing.
Figure 6:
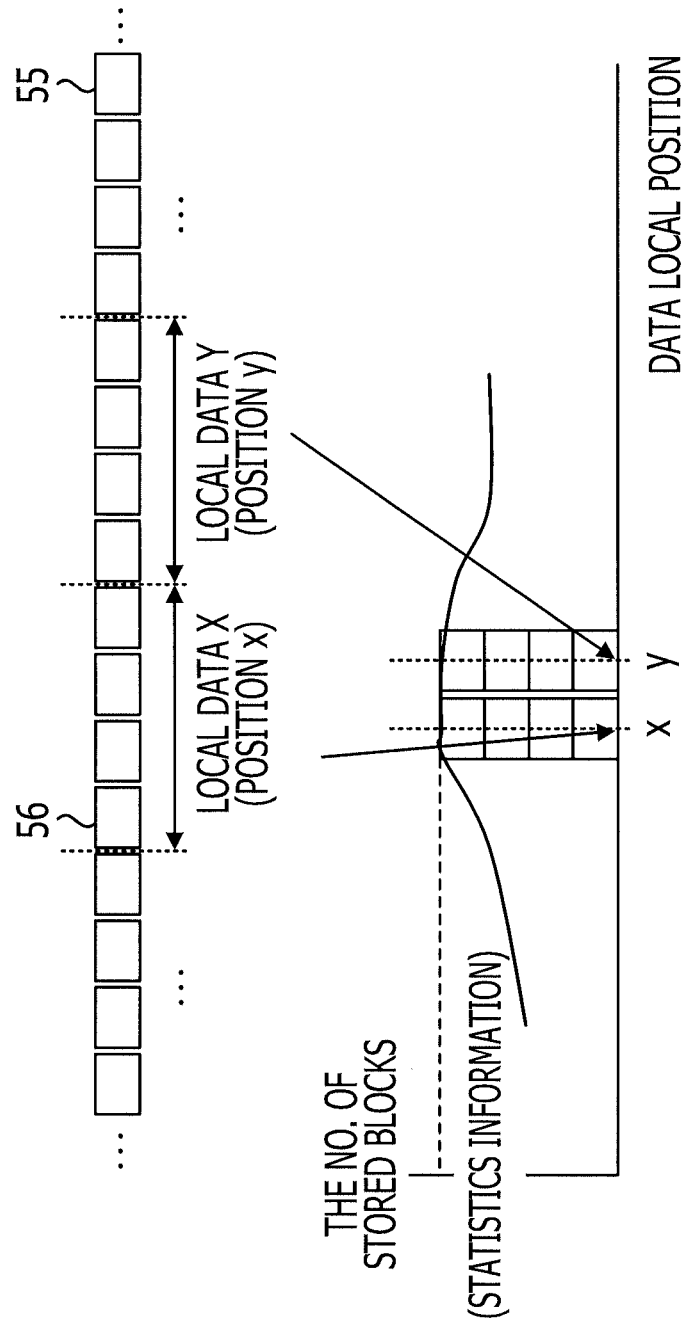
FIG. 6 illustrates a balancing control processing.

FIG. 3 is an example of a balancing control unit. FIGS. 4 to 6 illustrate balancing control processing.

The balancing control unit 4 transmits a balancing request that requests the transfer source storage 3 to transfer block data based basically on unused bandwidth information and data position information. At the time, the balancing control unit 4 transmits a transfer size and a transfer data position to the transfer source storage 3 as well.

For example, as illustrated in FIG. 4, it is assumed that the number of items of block data stored in the storage 3A is more than the number of items of block data stored in the storage 3B. For example, a ratio of data amounts stored in the storage 3A and that stored in the storage 3B is assumed to be, for example, 8:2.

Moreover, a network bandwidth that is available to the storage 3A is large while the network bandwidth available to the storage 3B is small. For example, a ratio of a network bandwidth available to the storage 3A and a network bandwidth available to the storage 3B is, for example, 6:4.

In the case of FIG. 4, the balancing control unit 4 makes a ratio of a data amount stored in the storage 3A and that stored in the storage 3B, 6:4 according to the ratio of the bandwidth. In other words, the balancing control unit 4 requests the storage 3A to transfer block data so that the ratio of the data amount is changed from 8:2 to the 6:4 that is substantially equal to the ratio of the bandwidth. As a result of transferring the block data, a delay in reading block data may be reduced if not prevented as indicated by the part Y in FIGS. 14B and 15.

Moreover, as illustrated in FIG. 5, regarding a data local position X in certain original data, the number of items of block data stored in the storage 3A is more than the number of items of the block data stored in the storage 3B. For example, a ratio of a data amount stored in the storage 3A and that stored in the storage 3B is, assumed to be, for example, 8:2.

Moreover, a network bandwidth that is available to the storage 3A is large while the network bandwidth available to the storage 3B is small. For example, a ratio of the network bandwidth available to the storage 3A and the network bandwidth available to the storage 3B is, for example, 6:4.

In the case of FIG. 5, the balancing control unit 4 determines a ratio of a data amount of a data local position X stored in the storage 3A and a data amount of the data local position X stored in the storage 3B as 6:4 according to the ratio of the bandwidth. In other words, the balancing control unit 4 requests the storage 3A to transfer block data so that the ratio of the data amount of the data local position X is changed from 8:2 to the 6:4 that is substantially equal to the ratio of the bandwidth. As a result of transferring the block data, a delay in reading block data as indicated by the part Y in FIG. 19 may be reduced if not prevented.

In order to perform the above-described balancing processing, the balancing control unit 4 obtains the number of items of block data 56 of the original data 55 stored at each data local position of each of the storages 3A to 3C.

The data local position X is, as illustrated in FIG. 6, a certain range in the original data 55. The block data 56 that belongs to a range of the data local position X is called local data X. The data local position X is determined depending on a processing device that processes the original data, in other words, a processing program. The data local position X includes a certain plurality of items of block data. Therefore, the data local position X is fixed. Note that the data local position X may be variable by making the number of items of block data included in the data local position X as variable.

The original data 55 is identified by a data ID that uniquely defines data. The block data 56 is identified by a block number that uniquely defines block data 56. The block number is assigned sequentially from the first block.

The number of items of block data included in the data local position X is fixed and the number of divisions is also fixed. Accordingly, as described in detail below, if a ratio of bandwidths of the network 24A to 24C which are available to each of the storages 3A, 3B, and 3C is obtained, the block data included in the data local position X may be distributed to the storages 3A, 3B, and 3C respectively.

FIGS. 4 and 5 illustrate a concept of balancing control. The actual balancing control is achieved by processing which is described in detail below by referring to FIGS. 7 to 11. Actually, executing processing illustrated in FIG. 5 for all data local positions in the original data results in executing the processing illustrated in FIG. 4. The processing which is described by referring to FIGS. 7 to 11 is executing processing illustrated in FIG. 5 for all data local positions of the original data.

Moreover, as described in detail below, the data amount is represented by a number of items of block data, and therefore, technically, making a ratio of data amounts of the data local position X substantially the same as the ratio of the bandwidths is difficult. Thus, a ratio of a data amount of the data local position X may not necessarily match with the ratio of the bandwidths, and may be substantially the same. An acceptable range that the ratio of data amounts of the data local position X and the ratio of the bandwidths is substantially the same may be empirically determined.

The balancing control unit 4 includes a data amount statistics unit 41 and a data amount comparison unit 42. The data amount statistics unit 41 generates an accumulated data amount and data distribution information based on a data amount and data position information, and inputs the accumulated data amount and data distribution information to the data amount comparison unit 42. The data amount comparison unit 42 generates a balancing request, a transfer size, and a transfer data position based on an accumulated data amount, data distribution information, the number of divisions, unused bandwidth information, and total bandwidth information and transmits the balancing request, the transfer size, and the transfer data position to the storage 3. The data amount comparison unit 42 transmits the balancing information to the data amount statistics unit 41. The balancing information is a balancing request, a transfer size, and a transfer data position.

Hereinafter, balancing control in the distributed storage system is specifically described by referring to FIGS. 7 to 11.

Figure 7:
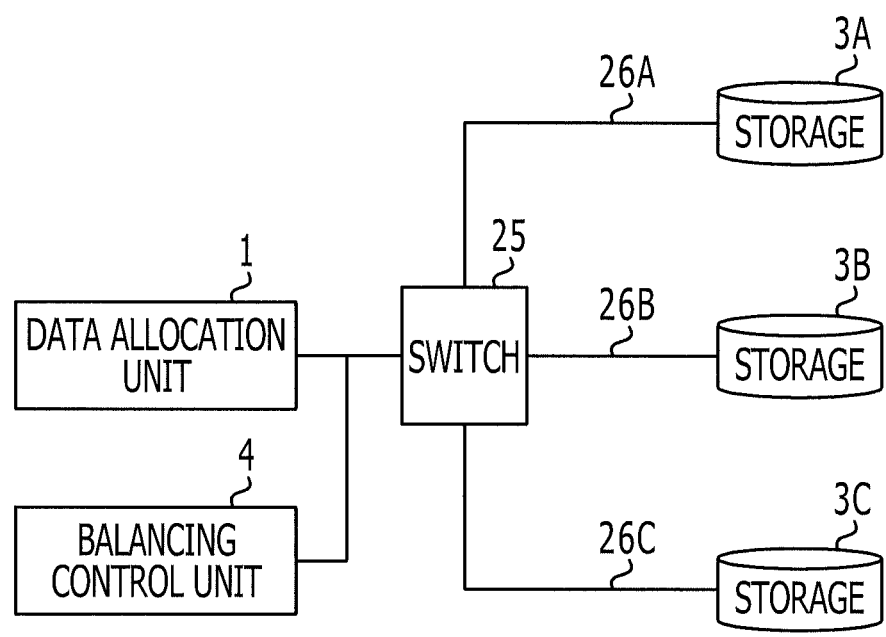
FIG. 7 illustrates an example of a balancing control.

In the description hereinafter, as illustrated in FIG. 7, the data allocation unit 1 and the balancing control unit 4 are coupled to the three storages 3A to 3C through a switch 25. The switch 25 corresponds to the network 24D, the switch 23, the network 21, and the probe 22. The networks 26A to 26C are networks for the storages 3A to 3C and correspond to the networks 24A to 26C.

The route planning unit 6 calculates unused bandwidth information for the storages 3A to 3C as illustrated in FIGS. 8 and 9.

For example, when data is transferred from the storage 3A to the storage 3B by balancing control, the transferred data passes through the network 24A, the switch 23, the network 21, the probe 22, the network 21, the switch 23, and the network 24B. The route planning unit 6 determines the route based on the route information.

As described above, data transfer capability of the networks 24A and 24B is 100 Mbps, while that of the network 21 is 1 Gbps. The data transfer capability is an upper limit of a total bandwidth. The data transfer capability is maintained by the network monitor unit 5. Meanwhile, the processing device 11 accesses the storage 3A and uses the network 24A. The access is prioritized over data transfer by the balancing control.

Network congestion information for the network 24A is represented, for example, by data transfer capability of the network 24A and the bandwidth being used. Accordingly, the route planning unit 6 obtains the data transfer capability of the network 4A and the bandwidth of the network 4A used by the processing device 11 as network congestion information of the network 4A from the network monitor unit 5.

Figure 8A:
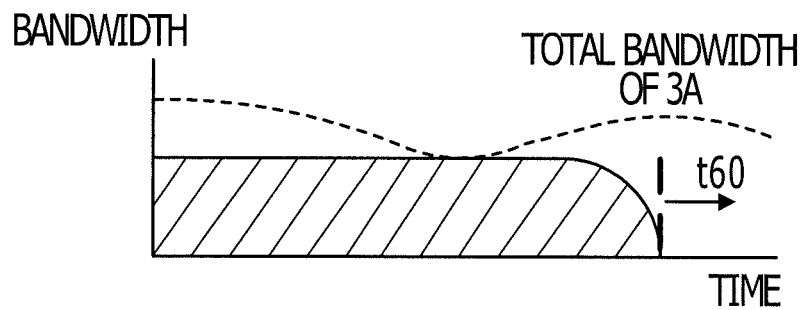
FIGS. 8A, 8B, and 8C illustrate an example of balancing control.

In this case, a bandwidth available to the video encoder 10 is obtained by subtracting the bandwidth used by the processing device 11 from the data transfer capability. The value is the bandwidth available to the video encoder 10 for the storage 3A, in other words, a total bandwidth of the storage 3A as illustrated in FIG. 8A.

It is assumed that the video encoder 10 accesses the storage 3A in order to store the original data and uses the network 24A. The access is prioritized over the data transfer by the balancing control. The bandwidth used by the video encoder 10 for the access is the used bandwidth. The used bandwidth is notified from the data allocation unit 1 to the route planning unit 6.

The route planning unit 6 subtracts the used bandwidth of the network 24A from the total bandwidth of the network 24A. The obtained value is a bandwidth available for data transfer by balancing control, in other words, an unused bandwidth of the storage 3A, for example, as illustrated in FIG. 8A.

When data is transferred from the storage 3A to the storage 3B by balancing control, the transferred data passes through the network 21. Accordingly, the route planning unit 6 actually calculates the total bandwidth, the used bandwidth and the unused bandwidth of the network 21 as well. However, the data transfer capability of the network 21 is sufficiently larger than the data transfer capability of the network 24A, for example. Thus, the network 24A is less likely to be influenced by a congestion state of the network 21. Therefore, processing for the total bandwidth, the used bandwidth and the unused bandwidth of the network 21 may be omitted.

When data is transferred from the storage 3A to the storage 3B by balancing control, a bandwidth used by the data transfer is notified to the route planning unit 6 by the data allocation unit 1 as the used bandwidth.

In FIG. 8A, a total bandwidth of the storage 3A is indicated by the dashed line, while a used bandwidth of the storage 3A is indicated by the diagonal line. The total bandwidth is obtained as total bandwidth information and the used bandwidth is obtained as used bandwidth information. The difference between the total bandwidth and the used bandwidth corresponds to the unused bandwidth of the storage 3A. The unused bandwidth is obtained as the unused bandwidth information.

The total bandwidth and the unused bandwidth of the storage 3A are dynamically changed as time elapses. When the data allocation unit 1 ends transmitting block data to the storage 3A at time t60, the used bandwidth of the storage 3A becomes "0", and the unused bandwidth of the storage 3A corresponds to the total bandwidth.

Figure 8B:
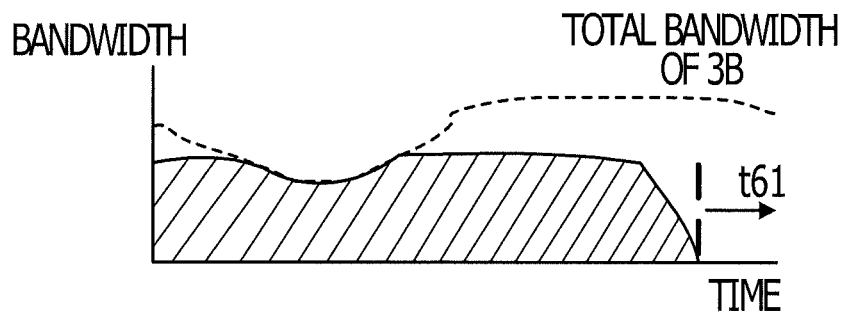

In FIG. 8B, a total bandwidth of the storage 3B is indicated by the dashed line, while a bandwidth used by the storage 3B is indicated by the diagonal line. The difference between the total bandwidth and the used bandwidth is the unused bandwidth of the storage 3B. The total bandwidth and the unused bandwidth of the storage 3B are dynamically changed as time elapses. When the data allocation unit 1 ends transmitting block data to the storage 3B at time t61, the used bandwidth of the storage 3B becomes "0", and the unused bandwidth of the storage 3B corresponds to the total bandwidth.

Figure 8C:
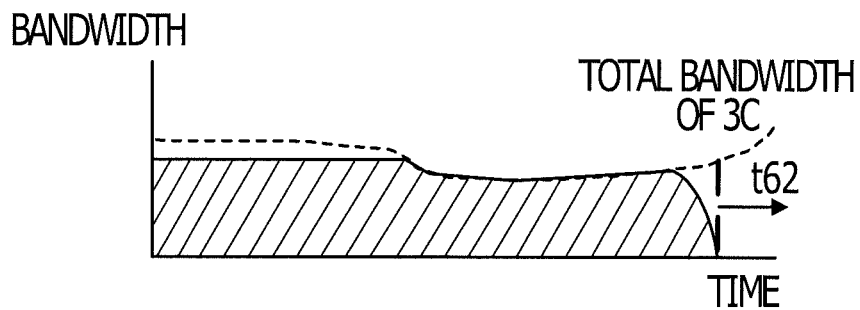

In FIG. 8C, a total bandwidth of the storage 3C is indicated by the dashed line, while a used bandwidth of the storage 3C is indicated by the diagonal line. The difference between the total bandwidth and the used bandwidth is the unused bandwidth of the storage 3C. The total bandwidth and the unused bandwidth of the storage 3C are dynamically changed as time elapses. When the data allocation unit 1 ends transmitting block data to the storage 3C at time t61, the used bandwidth of the storage 3C becomes "0", and the unused bandwidth of the storage 3C corresponds to the total bandwidth.

As described above, the total bandwidth and the unused bandwidth of the storages 3A to 3C are dynamically changed as time elapses and predicting the total bandwidth and the unused bandwidth is virtually impossible. Hence, the balancing control unit 4 does not predict change in the total bandwidth and the unused bandwidth of the storages 3A to 3C. FIGS. 8 and 9 illustrate changes in the total bandwidth and the unused bandwidth of the storages 3A to 3C with the elapse of time for a description purpose.

The balancing control unit 4 determines the number of items of transfer target block data so that a ratio of the number of items of block data stored in each of the storages 3A to 3C becomes substantially equal to a ratio of the unused bandwidth information for the plurality of networks. Moreover, the balancing control unit 4 determines, for each of the storages 3A to 3C, transfer target block data so that a ratio of the number of items of block data for each data local position defined based on data position information for a plurality of items of consecutive block data in the original data becomes substantially equal to a ratio of the unused bandwidth information for the plurality of networks.

The balancing control unit 4 determines a threshold of the number of items of block data for each data local position in each of the storages 3A to 3C according to a ratio of the unused bandwidth information for the plurality of networks in order to obtain transfer target block data. Moreover, the balancing control unit 4 assumes, for each data local position, the storage that stores block data the number of which exceeds the threshold as the transfer source storage 3, while the storage that stores block data the number of which is below the threshold as the transfer destination storage 3.

The balancing control unit 4 transmits a transfer request to the transfer source storage 3 for one or a plurality of items of block data that is selected from the transfer target block data based on the unused bandwidth information for the plurality of networks. In other words, the balancing control unit 4 transfers block data among the storages 3A to 3C so that data amounts becomes substantially optimum based on the total bandwidth and the unused bandwidth of the storages 3A to 3C when the balancing control processing is executed. Accordingly, when the balancing control processing is executed, block data may be distributed according to the unused bandwidth of the storage 3A to 3C. Consequently, even if reading original data is started immediately after executing balancing control processing, the original data may be immediately read without wasting bandwidths of the storages 3A to 3C.

Figure 9A:
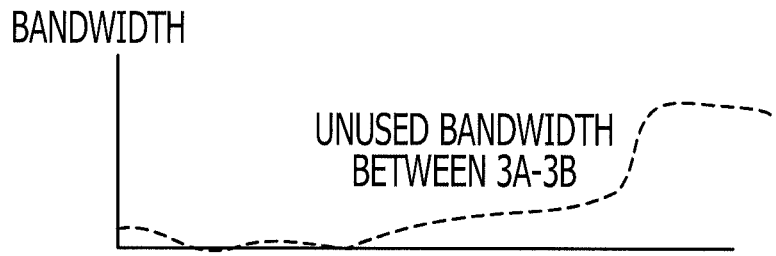
FIGS. 9A, 9B, and 9C illustrate an example of balancing control.

In FIG. 9A, the unused bandwidth between the storage 3A and the storage 3B, in other words, an excess bandwidth is indicated by the dashed line. The unused bandwidth between the storage 3A and the storage 3B is an overlapped part of the unused bandwidth of the storage 3A in FIG. 8A and the unused bandwidth of the storage 3B in FIG. 8B. In other words, the overlapped part corresponds to smaller one of the unused bandwidth of the storage 3A in FIG. 8A or that of the storage 3B. The unused bandwidth between the storage 3A and the storage 3B is a bandwidth that may be used for transferring block data between the storage 3A and the storage 3B based on the balancing request.

Figure 9B:

In FIG. 9B, the unused bandwidth between the storage 3B and the storage 3C, in other words, an excess bandwidth is indicated by the dashed line. The unused bandwidth between the storage 3B and the storage 3C is an overlapped part of the unused bandwidth of the storage 3B in FIG. 8B and the unused bandwidth of the storage 3C in FIG. 8C. In other words, the overlapped part corresponds to smaller one of the unused bandwidth of the storage 3B in FIG. 8B or the unused bandwidth of the storage 3C. The unused bandwidth between the storage 3B and the storage 3C is a bandwidth that may be used for transferring block data between the storage 3B and the storage 3C based on the balancing request.

Figure 9C:
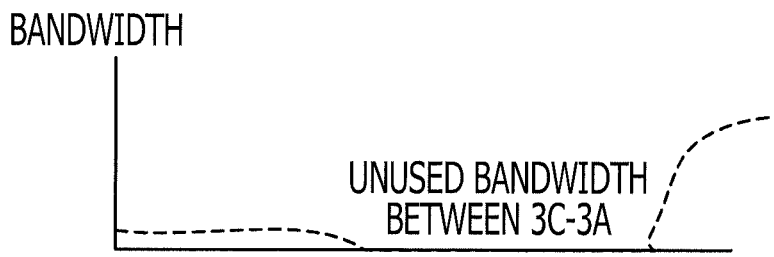

In FIG. 9C, the unused bandwidth between the storage 3C and the storage 3A, in other words, an excess bandwidth is indicated by the dashed line. The unused bandwidth between the storage 3C and the storage 3A is an overlapped part of the unused bandwidth of the storage 3C in FIG. 8C and that of the storage 3A in FIG. 8A. In other words, the overlapped part corresponds to smaller one of the unused bandwidth of the storage 3C in FIG. 8C or the unused bandwidth of the storage 3A. The unused bandwidth between the storage 3C and the storage 3A is a bandwidth that may be used for transferring block data between the storage 3C and the storage 3A based on the balancing request.

For example, a bandwidth of the network 26A that is connected to the storage 3A is changed as illustrated in FIG. 8A. In the total bandwidth of the storage 3A, the data allocation unit 1 is given priority to use the bandwidth. In other words, the balancing control unit 4 makes the storage 3A execute the balancing request by using the unused bandwidth. Accordingly, accesses from the data allocation unit 1 to the storage 3 are prioritized over data transfer caused by balancing control processing and impeding the accesses from the data allocation unit 1 to the storage 3 may be reduced if not prevented.

The accesses from the data reading unit to the storage 3 may be prioritized over the data transfer caused by the balancing control processing. Accordingly, impeding accesses from the data reading unit to the storage 3 may be reduced if not prevented.

For example, the balancing control unit 4 does not use the bandwidth of the network 26A that is connected to the storage 3A unless the unused bandwidth exists when the data allocation unit 1 uses the bandwidth of the network 26A. Therefore, the balancing control unit 4 does not transmit a balancing request to the storage 3A when the data allocation unit 1 uses the bandwidth of the network 26A and there is no unused bandwidth. Meanwhile, the balancing control unit 4 uses the bandwidth of the network 26A that is connected to the storage 3A if there is any unused bandwidth even when the data allocation unit 1 uses the bandwidth of the network 26A. Accordingly, the balancing control unit 4 transmits a balancing request to the storage 3A as necessary when data allocation unit 1 uses the bandwidth of the network 26A and there is any unused bandwidth.

Moreover, the balancing control unit 4 does not transmit a balancing request to the storage 3A when the block data transfer destination by the balancing request is the storage 3B unless there is any unused bandwidth between the storage 3A and the storage 3B. The balancing control unit 4 transmits a balancing request to the storage 3A when the block data transfer destination by the balancing request is the storage 3B and there is any unused bandwidth between the storage 3A and the storage 3B.

The balancing control unit 4 makes the storage 3B execute the balancing request by using the unused bandwidth of the storage 3B as in the storage 3A. The balancing control unit 4 makes the storage 3C execute the balancing request by using the unused bandwidth of the storage 3C.

A period to transmit a balancing request is limited typically by existence and non-existence of an unused bandwidth. However, for example, a balancing request may be transmitted to the storage 3A typically after elapsing time of t60.

Figure 10:
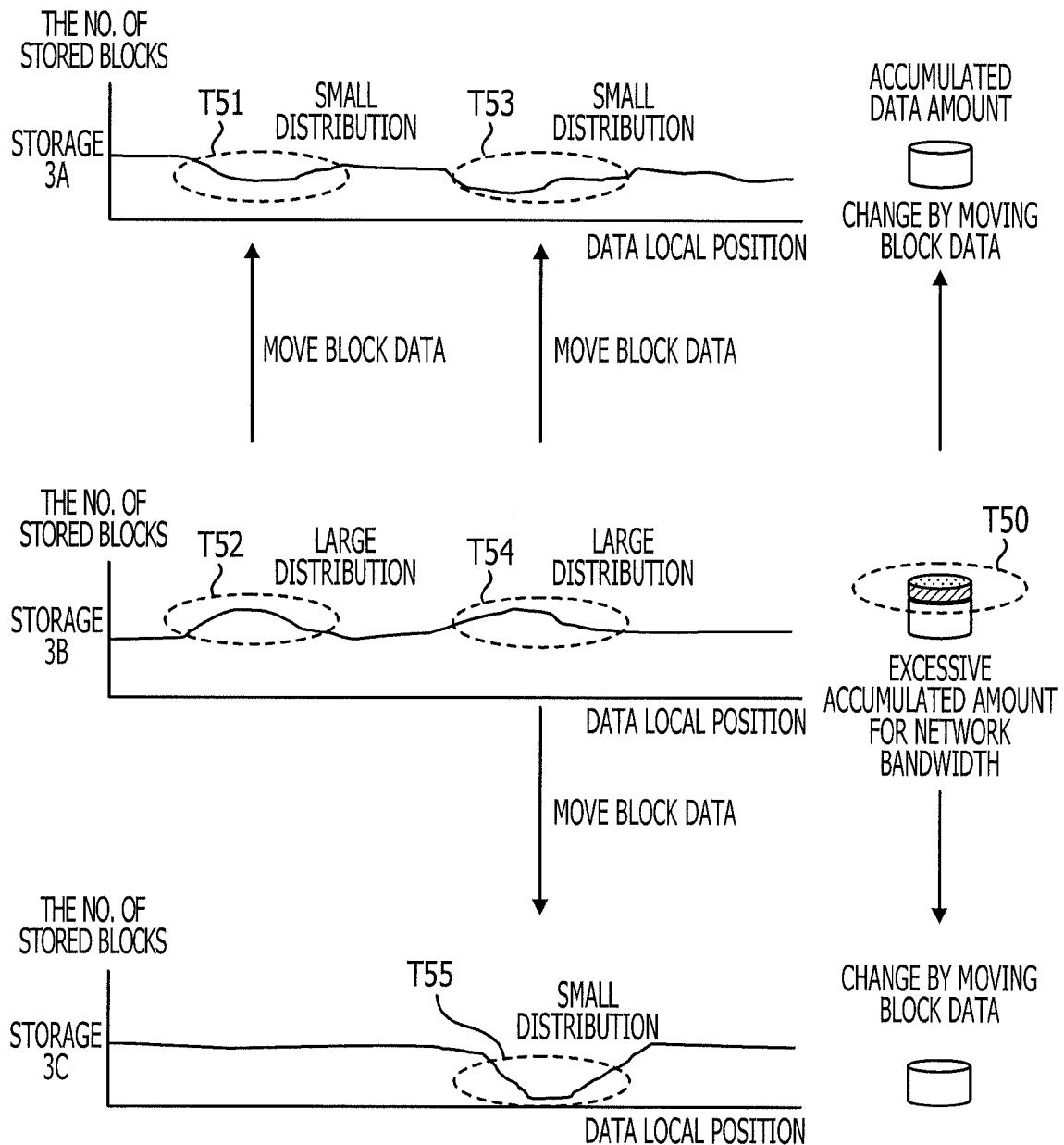
FIG. 10 illustrates an example of balancing control.
Figure 11:
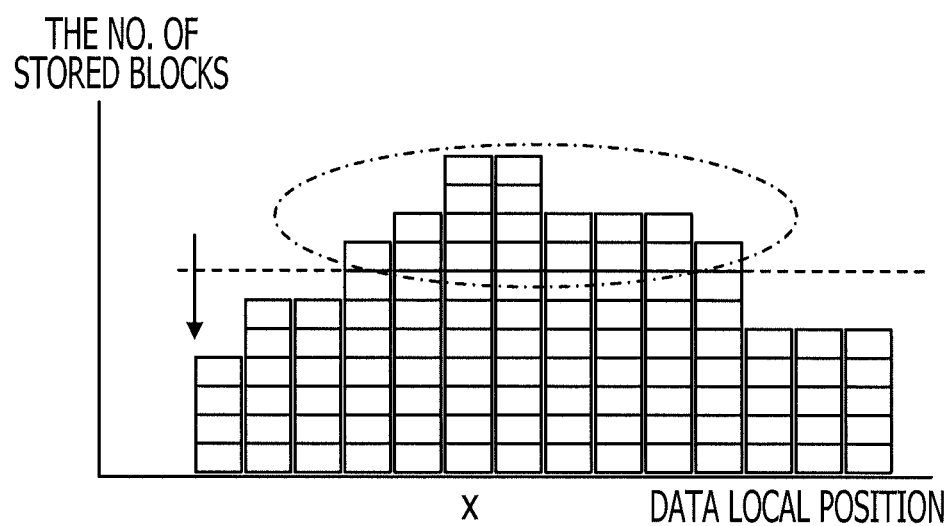
FIGS. 11A and 11B illustrate an example of a balancing control.

The balancing control unit 4 transmits a balancing request as illustrated in FIGS. 10 and 11.

The data allocation unit 1 transmits, for example, data ID, one or a plurality of block numbers, and a data local position as data position information to the balancing control unit 1 every time data is transmitted. The storage 3 transmits, for example, data ID, one or a plurality of block numbers, and a data size as data amount to the balancing control unit 4 every time data is received. Meanwhile, the video encoder 10 transmits, for example, data ID, the number of storages 3, and a plurality of devices ID as the number of divisions of original data to the balancing control unit 4. The number of storages 3 is the number of storages 3 that store the original data. The storage 3 is identified by a device ID that uniquely defines the storage 3.

Accordingly, the data amount statistics unit 41 of the balancing control unit 4 generates accumulated data amount and data distribution information for the original data. The data distribution information includes a data amount for each data local position and a block number of block data in the original data. In other words, as illustrated in FIG. 10, the balancing control unit 4 obtains distribution of block data for each data local position in a plurality of storages 3 that store the original data as statistics information.

Moreover, the balancing control unit 4 determines a ratio of accumulated data of original data in the plurality of storages 3 according to a ratio of unused bandwidth information of the plurality of storages 3 that stores the original data. The obtained ratio is substantially optimum amount of the original data in the plurality of storages 3 according to the unused bandwidth at the time.

The balancing control unit 4 determines a data amount transferred among the storages 3 based on the ratio of accumulated data and the statistics information illustrated in FIG. 10 and determines data local position where block data to be transferred exists. Accordingly, the transfer source storage 3 and the transfer destination storage 3 are determined. The balancing control unit 4 further determines block data to be transferred based on the unused bandwidth at the time and transmits a balancing request that is a transfer request.

As illustrated in FIG. 10, certain original data is assumed to be stored in the storages 3A to 3C in a distributed manner. The number of items of block data stored (the number of blocks stored) in the storages 3A to 3C is not balanced depending on data local positions. A ratio of data stored in the storages 3A to 3C is obtained as a ratio of the number of blocks stored.

For example, as illustrated in FIG. 11A, in each of the storages 3A to 3C, the number of items of block data is determined for each data local position of the original data.

Meanwhile, as described above, a network bandwidth available to each of the storages 3A to 3C is determined as illustrated in FIG. 8. Based on the obtained network bandwidth, a ratio of a network bandwidth available to each of the storages 3A to 3C at the time is determined.

A threshold of the number of items of block data in each of the storages 3A to 3C is determined based on the obtained ratio of network bandwidths. The threshold may be represented by the number of items of block data. For example, when a ratio of network bandwidths available to each of the storages 3A, 3B, and 3C is 1:2:3, a ratio of thresholds of the number of items of block data in each of the storages 3A, 3B, and 3C is 1:2:3 as well.

The threshold is determined as follows. As described above, the number of items of block data included in the data local position X is fixed and the number of divisions is fixed as well. Hence, if a ratio of network bandwidths available to each of the storages 3A, 3B, and 3C is determined, block data included in the data local position X may be allocated to each of the storages 3A, 3B, and 3C respectively. The number of allocated block data is a threshold for each of the storages 3A, 3B, and 3C.

When a data local position is variable, a data local position with substantially the largest number of block data in the storages 3A to 3C may be obtained and the number of data at the data local position may be used as an initial value of a threshold.

In the above case, the threshold is decremented by 1 from the initial value. An appropriate threshold value may be that the number of items of block data below the threshold in the transfer destination storage 3 corresponds to the number of items of block data that exceeds the threshold in the transfer source storage 3. The number of transfer source storages 3 and the number of the transfer destination storages 3 may be plural.

FIG. 10 illustrates the number of items of block data for each data local position in the storages 3A, 3B, and 3C. In FIG. 10, a ratio of network bandwidths available to each of the storages 3A, 3B, and 3C is assumed to be 1:1:1 for convenience of explanation. In this case, thresholds of the number of items of block data in each of the storages 3A, 3B, and 3C are substantially the same.

As illustrated in FIG. 10, for substantially the same data local position, for example, when a smaller amount of block data is stored in the storage 3A, almost always a larger amount of block data is stored in the other storage 3B. For example, when a portion T51 where the small amount of block data is stored exists in the storage 3A, for example, a portion T52 where large amount of block data is stored exists in the storage 3B.

In this case, block data that exceeds the threshold in the portion T52 of the storage 3B is transferred to the storage 3A. Accordingly, block data that exceeds the threshold in the portion T52 of the storage 3B is reduced, while block data that is below the threshold in the portion T51 of the storage 3A is increased. Consequently, the number of items of block data in each of the data local positions among the storages 3A to 3C is balanced so as to be substantially equal to the ratio of network bandwidths available to each of the storages 3A to 3C.

As illustrated in FIG. 10, for substantially the same data local position, for example, when smaller amounts of block data are stored in the storages 3A and 3C, almost always a larger amount of block data is stored in the other storage 3B. For example, a portion T54 to which large amount of block data is stored exists in the storage 3B when a portion T53 in the storage 3A and a portion T55 in the storage 3C store small amounts of block data.

In this case, block data that exceeds the threshold in the portion T54 of the storage 3B is transferred to the storages 3A and 3C. Accordingly, block data that exceeds the threshold in the portion T54 of the storage 3B is reduced and block data that is below the threshold of the portion T53 of the storage 3A and the portion T55 of the storage 3C are increased. Consequently, the number of items of block data in each of the data local positions among the storages 3A to 3C is balanced so as to be substantially equal to the ratio of network bandwidths available to each of the storages 3A to 3C.

FIG. 11A illustrates, for example, block data that exceeds a threshold in the portion T52 of the storage 3B. FIG. 11B illustrates typically the data local position X in the portion T52 of the storage 3B.

For example, the number of items of block data that exceeds the threshold at the data local position X is four. The number of items of block data that is below the threshold in the portion T51 of the storage 3A is obtained as well. In this case, the number of items of block data that is below the threshold in the data local position X is four.

Accordingly, a balancing request for the data local position X is transmitted to the storage 3B. In the balancing request, the transfer destination storage is the storage 3A. The transfer size is four. The transfer data position is the block numbers of four block data items that exceed the threshold. The storage 3B that receives the balancing request transfers the four block data items specified by the block numbers to the storage 3A. The storage 3A receives and stores the four block data items.

Block data to be transferred may be selected so that the block numbers of f block data stored in the transfer source storage 3B and the block numbers of block data stored in the transfer destination storage 3A are alternately arranged as a result of the transfer.

As may be understood from FIG. 11A, the number of items of block data that exceeds a threshold may be obtained for a data local position other than the data local position X. Conversely, the number of items of block data that is below the threshold may be obtained as well.

For example, FIG. 11A indicates block data that exceeds the threshold in the portion T54 of the storage 3B. In this case, FIG. 11B indicates that typically one data local position in the T54 of the storage 3B is extracted. In the description hereinafter, the extracted one data local position is indicated as "Y."

In this case, the number of items of block data that exceeds the threshold is four at the data local position Y. Conversely, the number of items of block data that is below the threshold at the portion T53 of the storage 3A is two, while the number of items of block data that is below the threshold at the portion T55 of the storage 3C is two.

Accordingly, a first and a second balancing requests for the data local position "Y" are transmitted to the storage 3B. In the first balancing request, the transfer destination storage is assumed to be the storage 3A. The transfer size that is transmitted together with the first balancing request is "2", and the transfer data position is the block numbers of two block data items that exceeds the threshold. In the second balancing request, the transfer destination storage is assumed to be the storage 3C. The transfer size that is transmitted together with the second balancing request is "2", and the transfer data position is the block numbers of two other block data items that exceed the threshold.

When the storage 3B receives the first balancing request, the storage 3B transfers the two block data items specified by the block numbers. The storage 3A receives and stores the two block data items. Moreover, when the storage 3B receives the second balancing request, the storage 3B transfers the two block data items specified by the block numbers to the storage 3C. The storage 3C receives and stores the two block data items.

Transfer target block data may be selected so that the four block data items transferred as a result of the transfer are alternately stored in the transfer destination storages 3A and 3C.

Figure 12:
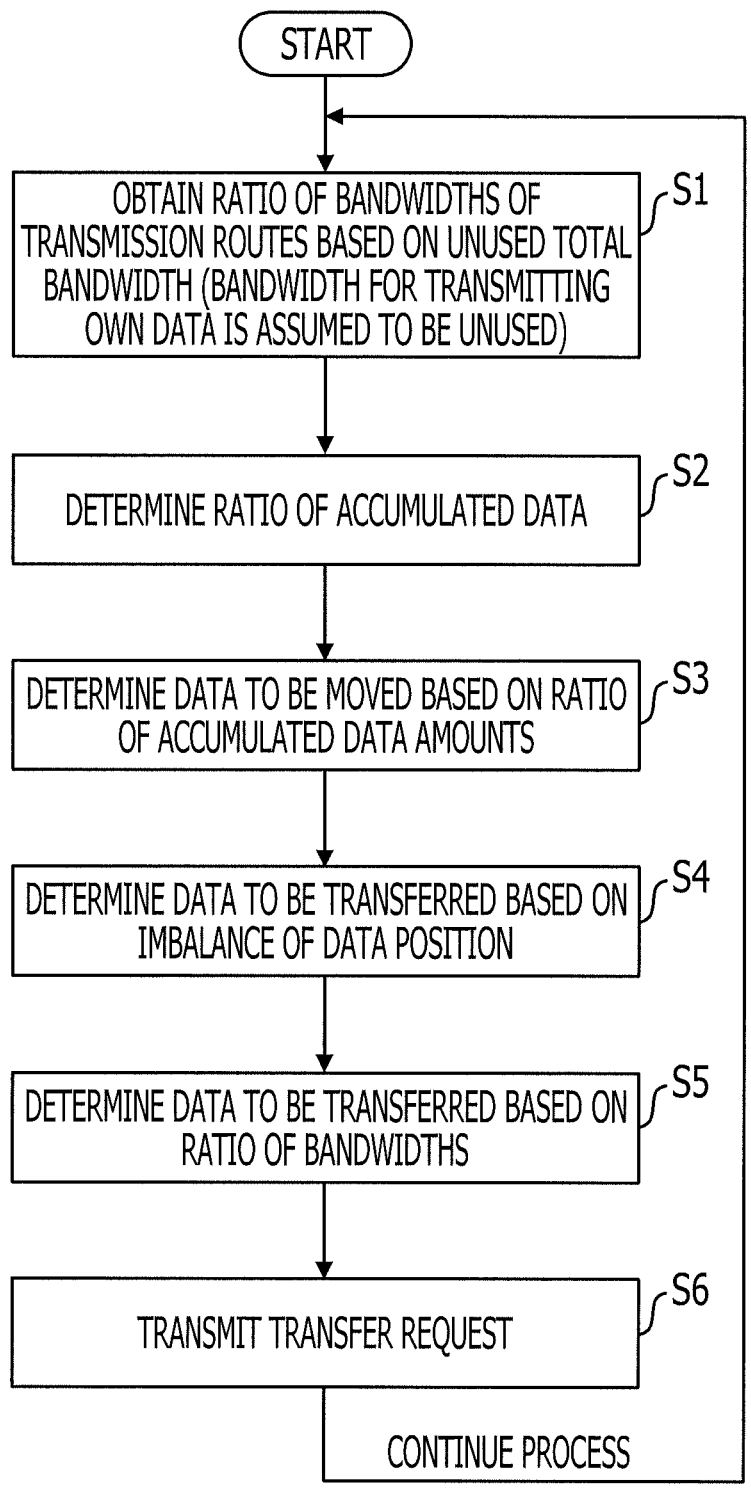
FIG. 12 is a flow diagram of a balancing control processing.

FIG. 12 is a flow of balancing control processing executed mainly by the balancing control unit 4.

The route planning unit 6 obtains network congestion information of the network 2 that connects from the network monitor unit 5 to the storages 3A to 3C and obtains used bandwidth information from the data allocation unit 1. The route planning unit 6 obtains unused bandwidth information and total bandwidth information for the network 2 that is connected to the storages 3A to 3C, for example, as illustrated in FIGS. 8 and 9 based on the obtained network congestion information and the used bandwidth information. Moreover, the route planning unit 6 obtains a ratio of bandwidth for the network 2 that is connected to the storages 3A to 3C based on the obtained unused bandwidth information (Operation S1).

The balancing control unit 4 obtains data position information from the data allocation unit 1 and obtains data amounts from the storages 3A to 3C. The balancing control unit 4, for example, as illustrated in FIGS. 10 and 11, obtains block data storing states (actual data amount) in the storages 3A to 3C based on the obtained data position information and data amount. The balancing control unit 4 obtains a ratio of block data items to be stored in the storages 3A to 3C (a ratio of accumulated data items) based on a ratio of bandwidths for the network 2 that is connected to the storages 3A to 3C (Operation S2).

The balancing control unit 4 obtains block data amount to be transferred among the storages 3A to 3C (data amount to be moved) based on actual data amount and the ratio of accumulated data for each data local position as illustrated in FIG. 10 (Operation S3).

The balancing control unit 4 determines data to be transferred for the storage 3 in which data to be moved is a positive value (a value that exceeds a threshold) based on an imbalance of block data items stored in the storages 3A to 3C (Operation S4). In other words, the balancing control unit 4 determines the number of items of block data that exceed the threshold as transfer target data as illustrated in FIG. 11.

The balancing control unit 4 determines transfer target block data transferred among the storage 3 for each data local position (Operation S5). The balancing control unit 4 determines transfer target block data based on bandwidth between the transfer source storage 3 and the transfer destination storage 3 illustrated in FIG. 9 and determines the transfer target block data so as not that the block numbers of the block data to be stored in the plurality of storages 3 after the transfer is imbalanced. The balancing control unit 4 transmits one or a plurality of balancing requests (transfer request) to the transfer source storage 3 for each data local position (Operation S6). Accordingly, the block data is transferred from the transfer source storage 3 to the transfer destination storage 3. After that, the Operation S1 is repeated.

Figure 13A:
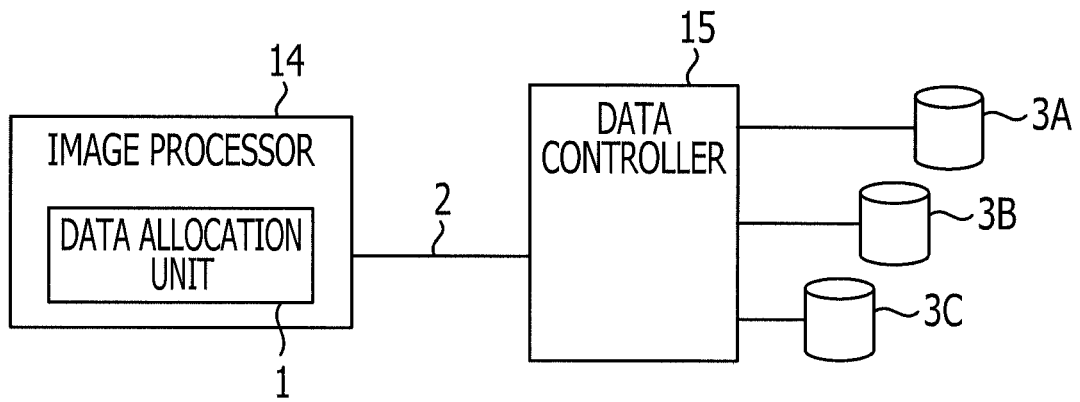
FIGS. 13A and 13B are other examples of a distributed storage system.

FIG. 13A illustrates another example of a distributed storage system.

The distributed storage system is, as illustrated in FIG. 13A, may include an image processor 14, a data controller 15, and a plurality of storages 3A to 3C. Moreover, the data allocation unit 1 may be provided in the image processor 14. The image processor 14 and the data controller 15 are, for example, connected by the network 2. In the example of FIG. 13A, the balancing control unit 4 and the route planning unit 6 are provided in the image controller 14 or the data controller 15.

Figure 13B:
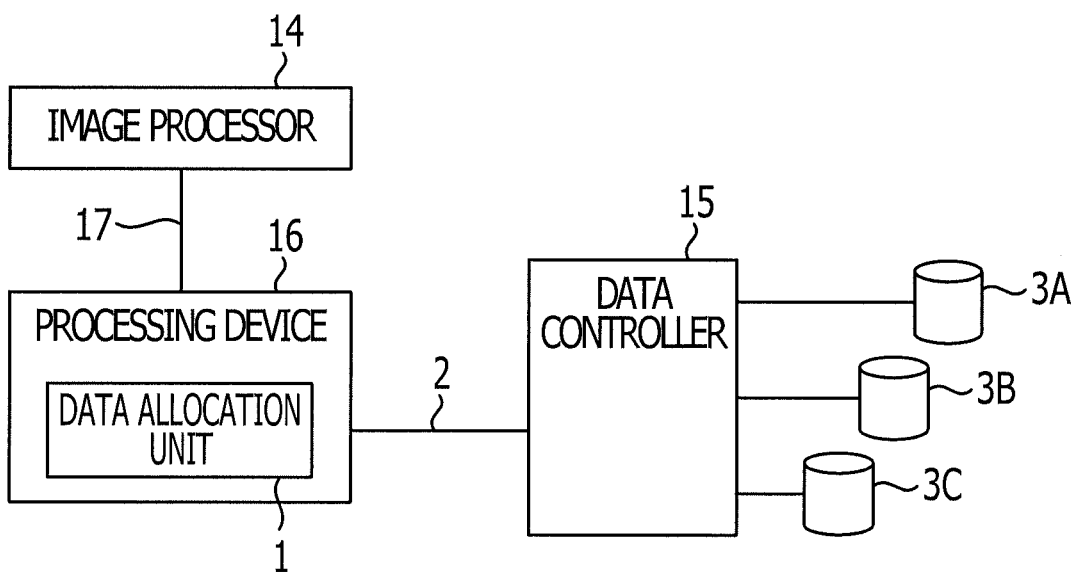

FIG. 13B is still another example of a distributed storage system.

The distributed storage system is, as illustrated in FIG. 13B, may include an image processor 14, a processing device 16, a data controller 15, and a plurality of storages 3A to 3C. The data allocation unit 1 may be provided in a component other than the image processor 14. The image processor 14 and the processing device 16 may be connected, for example, by a dedicated data transmission line 17. The data transmission line 17 is, for example, a bus, and a Local Area Network (LAN). The processing device 16 and the data controller 15 are connected, for example, by the network 2. Moreover, in the example of FIG. 13B, the balancing control unit 4 and the route planning unit 6 are provided in the image processor 14, the processing device 16, or the data controller 15.

According to the disclosed distributed storage system, appropriate distribution of data in a plurality of storages may be achieved in response to dynamically changing network bandwidths.

According to an embodiment a method of controlling distributed storage system includes dynamically determining unused bandwidth of at least one of available storages of the distributed storage system and adjustably controlling transfer of a target block data of a divided original data based on the unused bandwidth dynamically determined and content of the original data.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A distributed storage system, comprising:
a plurality of storages configured to store a plurality of items of block data obtained by dividing an original data in a distributed manner; a memory; and a processor executing an instruction stored in the memory to implement:
obtaining unused bandwidth information of a plurality of networks that are connected with the plurality of storages; and
selecting block data that is a target of a data transfer from a transfer source storage among the plurality of storages based on the unused bandwidth information, and position information indicating a position of the block data in the original data such that a block number of the position being above the threshold of the transfer source storage and a block number of the position being below the threshold of a transfer destination storage are alternatively arranged as a result of the data transfer.

2. The system according to claim 1, wherein a transfer request is transmitted to a transfer source storage of data transfer among the plurality of storages requesting the transfer source storage to transfer the block data to a transfer destination storage of the data transfer among the plurality of storages.

3. The system according to claim 2, wherein a size and the position information of the block data is transmitted together with the transfer request to the transfer source storage of the data transfer among the plurality of storages.

4. The device according to claim 1, comprising:
monitoring a plurality of networks connected with the plurality of storages and to obtain bandwidth information of the plurality of networks; and
wherein the unused bandwidth information of the plurality of networks is obtained based on the bandwidth information of the plurality of networks.

5. The system according to claim 1, wherein a number of items of the block data is obtained so that a ratio of the number of items of the block data stored in each of the plurality of storages becomes substantially equal to a ratio of the unused bandwidth information for the plurality of networks.

6. The system according to claim 5, comprising:
determining, for each of the plurality of storages, the block data so that a ratio of the number of items of block data for each data local position defined based on the position information for a plurality of items of consecutive block data in the original data becomes substantially equal to a ratio of unused bandwidth information for the plurality of networks.

7. The system according to claim 1, wherein a threshold of a number of items of block data is defined for each of data local positions in each of the plurality of storages according to a ratio of the unused bandwidth information for the plurality of networks, and for each data local position, a storage that stores the number of items of block data that exceeds the threshold is assumed to be a transfer source of data transfer among the plurality of storages and a storage that stores the number of items of block data below the threshold is assumed to be a transfer destination storage of the data transfer among the plurality of storages.

8. The system according to claim 7, comprising:
transmitting the transfer request for one of one block data item and a plurality of items of block data selected from the block data based on unused bandwidth information for the plurality of networks to a transfer source storage of data transfer among the plurality of storages.

9. A computer-readable non transitory storage medium storing a balancing control processing program that causes a computer having a distributed storage system to execute a process, comprising:
obtaining unused bandwidth information for a plurality of networks connected with a plurality of storages of the distributed storage system, said plurality of storages being configured to store a plurality of items of block data obtained by dividing an original data in a distributed manner; and
selecting block data that is a target of data transfer from a transfer source storage among the plurality of storages based on the unused bandwidth information of the plurality of networks and position information that indicates a position of the block data in the original data such that a block number of the position being above the threshold of the transfer source storage and a block number of the position being below the threshold of a transfer destination storage are alternatively arranged as a result of the data transfer.

10. The computer-readable non transitory medium according to claim 9, the program causing the computer to execute the process comprising:
transmitting a transfer request to a transfer source storage of data transfer among the plurality of storages requesting the transfer source storage to transfer the block data to a transfer destination storage of data transfer among the plurality of storages.

11. The computer-readable non transitory medium according to claim 10, the program causing the computer to execute the process comprising:
transmitting a size and the position information of the block data to the transfer source storage of data transfer among the plurality of storages together with the transfer request.

12. The computer-readable non transitory medium according to claim 9, the program causing the computer to execute the process comprising:
monitoring a plurality of networks connected with the plurality of storages and obtaining bandwidth information of the plurality of networks; and
wherein the obtaining of the unused bandwidth information is based on bandwidth information of the plurality of networks.

13. The computer-readable non transitory medium according to claim 9, the program causing the computer to execute the process comprising:
obtaining a number of items of the block data so that a ratio of the number of items of the block data stored in each of the plurality of storages becomes substantially equal to a ratio of the unused bandwidth information for the plurality of networks.

14. The computer-readable non transitory medium according to claim 13, the program causing the computer to execute the process comprising:
obtaining the block data, for each of the plurality of storages, so that a ratio of the number of items of block data for each data local position defined based on the position information for a plurality of items of consecutive block data in the original data becomes substantially equal to a ratio of unused bandwidth information for the plurality of networks.

15. The computer-readable non transitory medium according to claim 9, the program causing the computer to execute the process comprising:
defining a threshold of a number of items of block data for each of the data local positions in each of the plurality of storages according to a ratio of the unused bandwidth of the plurality of networks, and for each data local position, assuming a storage that stores the number of items of block data that exceeds the threshold as a transfer source storage of data transfer among the plurality of storages and assuming a storage that stores the number of items of block data below the threshold as a transfer destination storage of data transfer among the plurality of storages.

16. The computer-readable non transitory medium according to claim 15, the program causing the computer to execute the process comprising:
transmitting the transfer request to the transfer source storage of data transfer among the plurality of storages for one of one block data item or a plurality of items of block data selected from the block data based on unused bandwidth information for the plurality of networks.

17. A method of controlling distributed storage system, comprising:
executing by a processor:
dynamically determining unused bandwidth of across available storages of the distributed storage system; and
adjustably controlling transfer of a target block data of a divided original data based on the unused bandwidth dynamically determined and content of the original data, where the target block data is selected such that a block number of the position being above the threshold of a transfer source storage and a block number of the position being below the threshold of a transfer destination storage are alternatively arranged as a result of the data transfer.

* * * * *

UNITED STATES PATENT AND TRADEMARK OFFICE
CERTIFICATE OF CORRECTION

PATENT NO. : 8,539,069 B2  
APPLICATION NO. : 13/020230  
DATED : September 17, 2013  
INVENTOR(S) : Tomonori Kubota It is certified that error appears in the above-identified patent and that said Letters Patent is hereby corrected as shown below:

In the Claims:

In Column 20, Line 63, In Claim 17, after "bandwidth" delete "of".

Signed and Sealed this
Eighteenth Day of February, 2014

Michelle K. Lee
*Deputy Director of the United States Patent and Trademark Office*